US010332089B1

(12) United States Patent
Asmi et al.

(10) Patent No.: US 10,332,089 B1
(45) Date of Patent: Jun. 25, 2019

(54) DATA SYNCHRONIZATION SYSTEM

(71) Applicant: AMAZON TECHNOLOGIES, INC., Seattle, WA (US)

(72) Inventors: Yasser Baseer Asmi, Redmond, WA (US); Frank Florian Liberato, Jr., Kirkland, WA (US); Daniel Bibireata, Bellevue, WA (US); Bradley David Volen, Seattle, WA (US); Prafulla Jinendra Masalkar, Issaquah, WA (US); Todd Nelson Schoepflin, Edmonds, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 325 days.

(21) Appl. No.: 14/674,487

(22) Filed: Mar. 31, 2015

(51) Int. Cl.
*G06Q 20/20* (2012.01)
*H04L 29/08* (2006.01)
*H04N 7/18* (2006.01)
*H04N 5/05* (2006.01)
*G06Q 10/08* (2012.01)
*G06K 17/00* (2006.01)
*H04N 5/262* (2006.01)
*H04N 101/00* (2006.01)

(52) U.S. Cl.
CPC ....... *G06Q 20/203* (2013.01); *G06K 17/0022* (2013.01); *G06Q 10/087* (2013.01); *H04L 67/10* (2013.01); *H04N 5/05* (2013.01); *H04N 5/2628* (2013.01); *H04N 7/181* (2013.01); *G06K 2017/0051* (2013.01); *H04N 2101/00* (2013.01)

(58) Field of Classification Search
CPC combination set(s) only.
See application file for complete search history.

(56) References Cited

U.S. PATENT DOCUMENTS

| 7,225,980 | B2 | 6/2007 | Ku et al. |
| 7,949,568 | B2 | 5/2011 | Fano et al. |
| 8,009,864 | B2 | 8/2011 | Linaker et al. |
| 8,189,855 | B2 | 5/2012 | Opalach et al. |
| 8,630,924 | B2 | 1/2014 | Groenevelt et al. |
| 9,230,250 | B1 * | 1/2016 | Parker .................. G06Q 20/203 |

(Continued)

OTHER PUBLICATIONS

Asthana, et al., "An indoor wireless system for personalized shopping assistance", CiteSeerX, In Proceedings of IEEE Workshop on Mobile Computing Systems and Applications, 1994; [retrieved on Jun. 30, 2013]. Retrieved from the Internet: <URL:http://citeseerx.ist.psu.edu/viewdoc/summary?doi=10.1.1.127.3033>.

(Continued)

*Primary Examiner* — Janese Duley
(74) *Attorney, Agent, or Firm* — Lindauer Law, PLLC

(57) ABSTRACT

Frames of sensor data may be obtained from many sensors arranged throughout a facility. These frames may be time synchronized to support further processing. For example, frames containing image data obtained at about the same time from many cameras within the facility may be used to create an aggregate or "stitched" view of the facility at that time. The synchronization may involve storing the frames from several sensors in buffers. A time window may be specified and used in conjunction with timestamps of the frames to select a set of sensor data from the buffers that are deemed to be synchronized data. The synchronized data may then be used for further processing.

21 Claims, 11 Drawing Sheets

(56) References Cited

U.S. PATENT DOCUMENTS

| | | | |
|---|---|---|---|
| 9,235,928 B2 | 1/2016 | Medioni et al. | |
| 2008/0211915 A1* | 9/2008 | McCubbrey | G08B 13/19608 348/159 |
| 2009/0106807 A1* | 4/2009 | Suzuki | H04N 21/23424 725/114 |
| 2011/0011936 A1 | 1/2011 | Morandi et al. | |
| 2012/0284132 A1 | 11/2012 | Kim et al. | |
| 2013/0284806 A1 | 10/2013 | Margalit | |
| 2014/0028852 A1* | 1/2014 | Rathi | H04N 7/181 348/159 |
| 2014/0267588 A1* | 9/2014 | Arcas | G06T 3/4038 348/36 |
| 2015/0086107 A1 | 3/2015 | Dedeoglu et al. | |
| 2016/0088287 A1* | 3/2016 | Sadi | H04N 19/54 348/43 |
| 2017/0070674 A1* | 3/2017 | Thurow | H04N 7/181 |

OTHER PUBLICATIONS

Kalnikaite, et al., "How to Nudge In Situ: Designing Lambent Devices to Deliver Information Salience in Supermarkets", ACM, In proceeding of: UbiComp 2011: Ubiquitous Computing, 13th International Conference, UbiComp 2011, Beijing, China, Sep. 17-21, 2011. Retrieved from Internet: <URL:http://www.researchgate.net/publication/221568350_How_to_nudge_in_Situ_designing_lambent_devices_to_deliver_salient_information_in_super markets>.

Pop, Cristian, "Introduction to the BodyCom Technology", AN1391, DS01391A, Microchip Technology, Inc., May 2, 2011.

* cited by examiner

DATA SYNCHRONIZATION SYSTEM

BACKGROUND

Retailers, wholesalers, and other product distributors typically maintain an inventory of various items that may be ordered, purchased, leased, borrowed, rented, viewed, and so forth, by clients or customers. For example, an e-commerce website may maintain inventory in a fulfillment center. When a customer orders an item, the item is picked from inventory, routed to a packing station, packed, and shipped to the customer. Likewise, physical stores maintain inventory in customer accessible areas (e.g., shopping area), and customers can pick items from inventory and take them to a cashier for purchase, rental, and so forth. Many of those physical stores also maintain inventory in a storage area, fulfillment center, or other facility that can be used to replenish inventory located in the shopping areas or to satisfy orders for items that are placed through other channels (e.g., e-commerce). Other examples of entities that maintain facilities holding inventory include libraries, museums, rental centers, and so forth. In each instance, for an item to be moved from one location to another, it is picked from its current location and transitioned to a new location. It is often desirable to monitor the location or movement of inventory, users, and other objects within the facility.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features.

Figure 1:
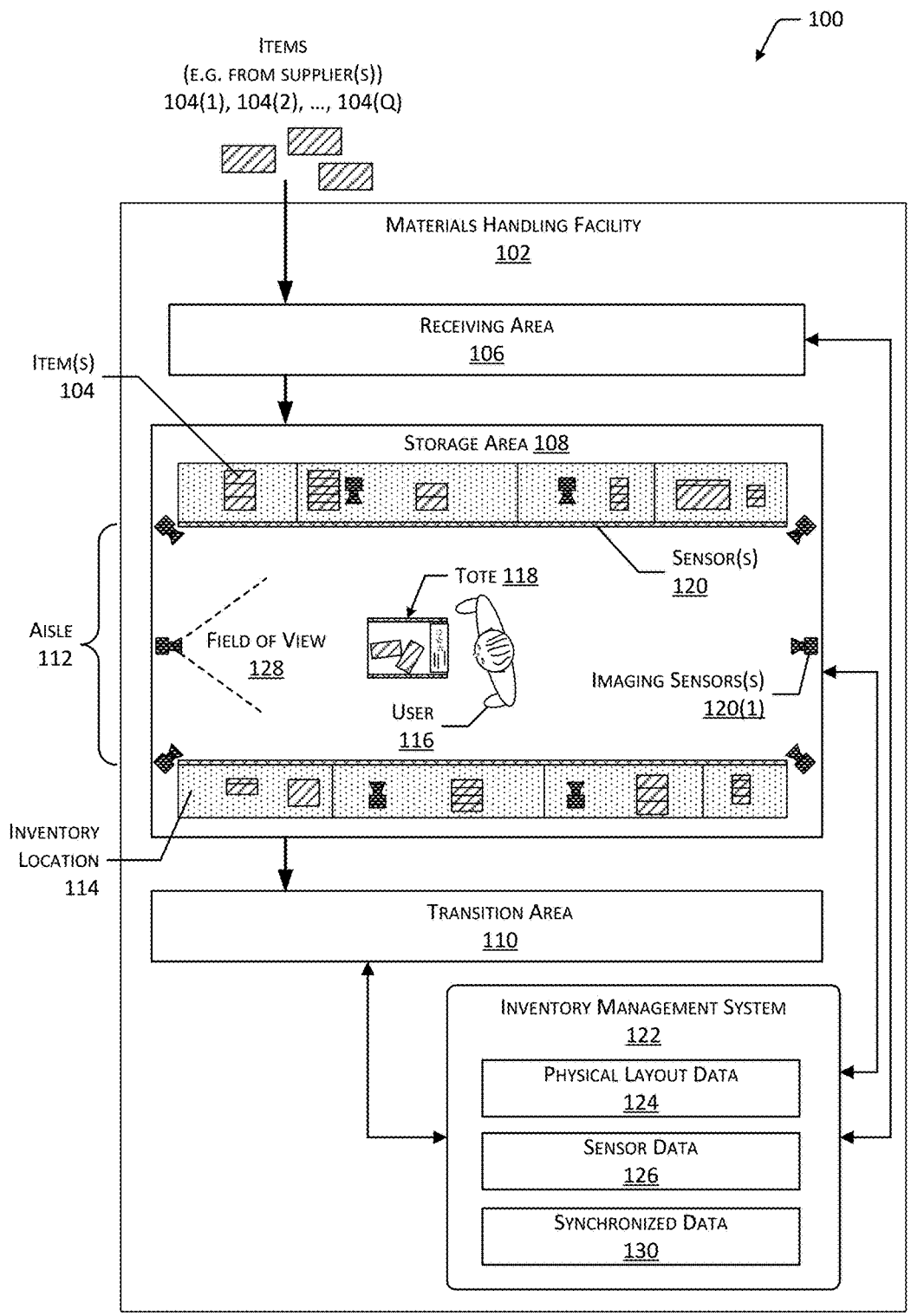
FIG. 1 is a block diagram illustrating a materials handling facility (facility) configured to use an inventory management system that is configured to generate and use synchronized data, according to some implementations.

While implementations are described herein by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

This disclosure describes systems and techniques for synchronizing data acquired from many sensors of a facility, such as a materials handling facility (facility). Imaging sensors, such as cameras, may be arranged within the facility to generate images. Other sensors may include touchpoint sensors, weight sensors, and so forth. Each sensor may generate a feed of frames of sensor data. For example, the imaging sensors may generate a feed of frames containing image data, the weight sensors may generate a feed of frames containing weight data, and so forth. The feed may comprise a series of consecutive frames containing data. The facility may include, or have access to, an inventory management system. The inventory management system may be configured to maintain information about items, users, condition of the facility, and so forth, using the frames of sensor data. For example, the inventory management system may maintain information indicative of location of a user in the facility, a quantity of items stowed at particular inventory locations, what items a particular user is handling, environmental status of the facility, and so forth, by processing the image data in the frames from the imaging sensors.

The inventory management system may use various techniques to process and analyze the frames of sensor data. For example, a machine vision system may process the image data to identify objects, track objects, and so forth, at the facility or in other settings. In another example, a touch system may use information from touchpoint sensors to determine which item at an inventory location (such as a shelf) the user has interacted with. These interactions may include, but are not limited to, picking the item, placing the item, touching the item, and so forth.

Sensors may be grouped into sensor clusters that share a common area of coverage within the facility. For example, the imaging sensors that have adjacent or overlapping fields-of-view in the same aisle of the facility may be designated as forming a sensor cluster. The frames from several sensor clusters may be processed by the inventory management system to determine information for use in operation of the facility. It may be advantageous to synchronize the frames for processing. For example, when determining the position of an object such as a person at a given instant in time, it may be useful to process the frames containing image data acquired at about the same time. Continuing the example, processing non-synchronized data, such as images showing the same user at different times and places may result in the inventory management system generating incorrect data, such as placing the same user simultaneously at different spots within the facility.

Described in this disclosure are systems and techniques to synchronize frames of data generated by two or more sensors. Different sensors may deliver frames at different rates. For example, an imaging sensor may deliver 15 frames of image data per second, a weight sensor may deliver 2 frames of weight data per second, and a proximity sensor may deliver 7 frames of proximity data per second. Furthermore, the delivery of the frames to a processing device such as a server may be irregular. For example, traffic congestion on a local area network may introduce latency in the delivery of packets carrying the frames, the sensor may be delayed in sending the frame due to other computational tasks, and so forth.

Several frames may be deemed to be synchronized when timestamps (or other indicia of time) associated with the frames occur within a particular time window or interval of time. For example, the interval of time may be about 70 milliseconds (ms) in width. Frames that occur within the same 70 ms window may thus be deemed to be synchronized. Thus, synchronized data may comprise a set of frames that have occurred contemporaneously or nearly-so with respect to one another.

Each of the sensors may generate a feed of frames. For example, the feed may comprise one or more frames sent from a sensor to another device such as a server. In one implementation, the feed may comprise a single connection that is maintained between the sensor and the receiving device. In another implementation, the feed may comprise data sent over many connections between the sensor and the receiving device. The many connections may be established in series, in parallel, or a combination thereof.

The frames in the feed may be sent at various times. For example, the frames in the feed may be sent at regular intervals. In another example, the frames may be sent at irregular intervals.

The frames may include header information such as a timestamp, sensor identifier, and so forth. For example, the timestamp may indicate the time, as reported by a clock internal to the sensor, at which the data in the frame was acquired. The frames may include payload information, such as image data, weight data, or other information. For example, the payload for a frame generated by an imaging sensor may comprise a series of images captured over some interval of time, while the payload for a frame generated by a weight sensor may comprise weight data as sampled over some interval of time.

The inventory management system may include a synchronization module. The synchronization module processes the feeds of frames from several sensors and determines sets of frames that are within a common time window. The set of frames that are determined to be within a common interval of time or time window may then be designated as synchronized data.

In one implementation, the synchronization module may generate synchronized data by using the following process. The frames from each feed may be stored in a separate buffer. For example, the facility may include three cameras, each camera generating a feed of frames. The frames received from a first camera may be stored in a first buffer, frames from a second camera may be stored in a second buffer, and frames from a third camera may be stored in a third buffer. Each of the frames has a timestamp indicating a time the frame was generated by the respective sensor.

Continuing the implementation, the process may determine a first set of frames. The first set of frames includes the oldest frame from each of the buffers. Oldest, newest, and so forth, may be determined by comparing the timestamp of one frame to another, comparing the timestamp of one frame to a current time, and so forth.

Among the first set of frames, a timestamp value of a newest frame is determined. For example, the frame in the second buffer may be the newest or most recently generated of the three frames in the first set of frames.

A time window may be designated, with a newest point of the time window being set to the timestamp value of the newest frame in the first set of frames. For example, an end point of the time window may be set to the time indicated by the time value of the newest frame. The time window has a duration that extends from a start point to the end point, with the start point being at an earlier or older time than the later or newer end point. Successive time windows may occur at irregular intervals with respect to one another, and may even overlap with one another in some implementations. For example, where the time window is 70 ms in duration, a first time window may start at time=10 and end at time=80, while the second time window may start at time=17 and end at time=97.

The frames having timestamps before the start point of the time window may be discarded or otherwise disregarded from further consideration. For example, these frames may be removed from the buffer.

For each buffer, the frame within the time window having a newest timestamp is determined. For example, within the time window the third buffer may have two frames. The frame that has a later timestamp that is closer to current time may be determined. Continuing the example, the first buffer may have only one frame within the time window, and the second buffer may have only one frame within the time window. These frames may be designated as the newest within the time window for their respective buffers.

The frames for each of the buffers that occur within the time window and have the newest timestamp may be designated as synchronized data. Continuing the example, the three frames may be designated as synchronized data. The synchronized data may be sent to other systems or modules for further processing. Once sent, the frames in the synchronized data may be discarded from the buffer, and the process may continue, selecting another set of synchronized data. Frames that were not included in the synchronized data may remain in the buffer.

In some situations, frames may be absent from the buffer, frames may be distributed in time such that they do not fall within the time window, and so forth. The inventory management system may specify service level guarantees, such as providing synchronized data within 1 second or less. A maximum delay value may be specified that indicates a maximum deviation from current time that frames may have to be considered.

In some implementations, frames that are older than this maximum delay value may be discarded from the buffers. In other implementations, a last known frame in the buffer may be retained and used in the synchronized data, even if that last known frame has a timestamp outside of the time window.

The synchronized data may be used by other modules, such as a data processing module. For example, the data processing module may "stitch" or join image data in the synchronized data to generate an aggregate image view that depicts the interior of the facility, or a portion thereof, at the time embodied by the time window. Continuing the example, the aggregate image view may appear to be a single image "snapshot" that is actually produced by the images obtained from many cameras at about the same time.

By using the data synchronization techniques described in this disclosure, data from many sensors in the facility may be synchronized to within a particular window of time relative to one another. The synchronized data may then be used to facilitate operation of the facility by providing contemporaneously acquired data that is indicative of a state of the facility and conditions therein within the time window. As a result, operation of the inventory management system in the facility may be improved, resulting in an improved user experience, reduced operating costs, and so forth.

Illustrative System

An implementation of a materials handling system 100 configured to store and manage inventory items is illustrated in FIG. 1. A materials handling facility 102 (facility) may comprise one or more physical structures or areas within which one or more items 104(1), 104(2), . . . , 104(Q) may be held. As used in this disclosure, letters in parenthesis such as "(Q)" indicate an integer value that may be greater than zero. The items 104 may comprise physical goods, such as books, pharmaceuticals, repair parts, electronic gear, and so forth.

The facility 102 may include one or more areas designated for different functions with regard to inventory handling. In this illustration, the facility 102 includes a receiving area 106, a storage area 108, and a transition area 110.

The receiving area 106 may be configured to accept items 104, such as from suppliers, for intake into the facility 102. For example, the receiving area 106 may include a loading dock at which trucks or other freight conveyances unload the items 104.

The storage area 108 is configured to store the items 104. The storage area 108 may be arranged in various physical configurations. In one implementation, the storage area 108 may include one or more aisles 112. The aisle 112 may be configured with, or defined by, inventory locations 114 on one or both sides of the aisle 112. The inventory locations 114(1), 114(2), . . . , 114(L) may include one or more of shelves, racks, cases, cabinets, bins, floor locations, slatwalls, pegboards, trays, dispensers, or other suitable storage mechanisms. The inventory locations 114 may be affixed to the floor or another portion of the facility's 102 structure. The inventory locations 114 may also be movable such that the arrangements of aisles 112 may be reconfigurable. In some implementations, the inventory locations 114 may be configured to move independently of an outside operator. For example, the inventory locations 114 may comprise a rack with a power source and a motor, operable by a computing device to allow the rack to move from one location within the facility 102 to another. Continuing the example, the inventory location 114 may move from one aisle 112 to another, from one location within an aisle 112 to another, and so forth. In another example, the inventory locations 114 may be configured to translate, rotate, or otherwise move relative to the facility 102.

One or more users 116(1), 116(2), . . . , 116(U) and totes 118(1), 118(2), . . . , 118(T), or other material handling apparatuses may move within the facility 102. For example, the user 116 may move about within the facility 102 to pick or place the items 104 in various inventory locations 114, placing them on the tote 118 for ease of transport. The tote 118 is configured to carry or otherwise transport one or more items 104. For example, the totes 118 may include carts, baskets, bags, bins, and so forth. In some implementations, the tote 118 may incorporate one or more inventory locations 114. For example, the tote 118 may include a bin, basket, shelf, and so forth.

Instead of, or in addition to the users 116, other mechanisms such as robots, forklifts, cranes, aerial drones, conveyors, elevators, pipes, and so forth, may move items 104 about the facility 102. For example, a robot may pick the item 104 from a first inventory location 114(1) and move the item 104 to a second inventory location 114(2).

One or more sensors 120 may be configured to acquire information in the facility 102. The sensors 120 may include, but are not limited to, cameras, 3D sensors, weight sensors, radio frequency (RF) receivers, temperature sensors, hygrometers, vibration sensors, and so forth. The sensors 120 may be stationary or mobile, relative to the facility 102. For example, the inventory locations 114 may contain imaging sensors 120(1), such as cameras, configured to acquire images of picking or placement of items 104 on shelves, of the users 116 in the facility 102, and so forth. In another example, the floor of the facility 102 may include weight sensors configured to determine a weight of the user 116 or other object thereupon. The sensors 120 are discussed in more detail below with regard to FIG. 2.

While the storage area 108 is depicted as having one or more aisles 112, inventory locations 114 storing the items 104, sensors 120, and so forth, it is understood that the receiving area 106, the transition area 110, or other areas of the facility 102 may be similarly equipped. Furthermore, the arrangement of the various areas within the facility 102 is depicted functionally rather than schematically. In some implementations, multiple different receiving areas 106, storage areas 108, and transition areas 110 may be interspersed rather than segregated.

The facility 102 may include, or be coupled to, an inventory management system 122. The inventory management system 122 is configured to interact with users 116 or devices such as sensors 120, robots, material handling equipment, computing devices, and so forth, in one or more of the receiving area 106, the storage area 108, or the transition area 110.

The facility 102 may be configured to receive different kinds of items 104 from various suppliers and to store them until a customer orders or retrieves one or more of the items 104. A general flow of items 104 through the facility 102 is indicated by the arrows of FIG. 1. Specifically, as illustrated in this example, items 104 may be received from one or more suppliers, such as manufacturers, distributors, wholesalers, and so forth, at the receiving area 106. In various implementations, the items 104 may include merchandise, commodities, perishables, or any suitable type of item 104, depending on the nature of the enterprise that operates the facility 102.

Upon being received from a supplier at the receiving area 106, the items 104 may be prepared for storage. For example, items 104 may be unpacked or otherwise rearranged. The inventory management system 122 may include one or more software applications executing on a computer system to provide inventory management functions. These inventory management functions may include maintaining information indicative of the type, quantity, condition, cost, location, weight, or any other suitable parameters with respect to the items 104. The items 104 may be stocked, managed, or dispensed in terms of countable, individual units or multiples, such as packages, cartons, crates, pallets, or other suitable aggregations. Alternatively, some items 104, such as bulk products, commodities, and so forth, may be stored in continuous or arbitrarily divisible amounts that may not be inherently organized into countable units. Such items 104 may be managed in terms of measurable quantity such as units of length, area, volume, weight, time, duration, or other dimensional properties characterized by units of measurement. Generally speaking, a quantity of an item 104 may refer to either a countable number of individual or aggregate units of an item 104 or a measurable amount of an item 104, as appropriate.

After arriving through the receiving area 106, items 104 may be stored within the storage area 108. In some implementations, like items 104 may be stored or displayed together in the inventory locations 114 such as in bins, on shelves, hanging from pegboards, and so forth. In this implementation, all items 104 of a given kind are stored in one inventory location 114. In other implementations, like items 104 may be stored in different inventory locations 114. For example, to optimize retrieval of certain items 104 having frequent turnover within a large physical facility 102, those items 104 may be stored in several different inventory locations 114 to reduce congestion that might occur at a single inventory location 114.

When a customer order specifying one or more items 104 is received, or as a user 116 progresses through the facility 102, the corresponding items 104 may be selected or "picked" from the inventory locations 114 containing those items 104. In various implementations, item picking may range from manual to completely automated picking. For example, in one implementation, a user 116 may have a list of items 104 they desire and may progress through the facility 102 picking items 104 from inventory locations 114 within the storage area 108 and placing those items 104 into a tote 118. In other implementations, employees of the facility 102 may pick items 104 using written or electronic pick lists derived from customer orders. These picked items 104 may be placed into the tote 118 as the employee progresses through the facility 102.

After items 104 have been picked, they may be processed at a transition area 110. The transition area 110 may be any designated area within the facility 102 where items 104 are transitioned from one location to another or from one entity to another. For example, the transition area 110 may be a packing station within the facility 102. When the items 104 arrive at the transition area 110, the items 104 may be transitioned from the storage area 108 to the packing station. Information about the transition may be maintained by the inventory management system 122.

In another example, if the items 104 are departing the facility 102, a list of the items 104 may be obtained and used by the inventory management system 122 to transition responsibility for, or custody of, the items 104 from the facility 102 to another entity. For example, a carrier may accept the items 104 for transport with that carrier accepting responsibility for the items 104 indicated in the list. In another example, a customer may purchase or rent the items 104 and remove the items 104 from the facility 102.

During use of the facility 102, the user 116 may move about the facility 102 to perform various tasks, such as picking or placing the items 104 in the inventory locations 114. The user 116, operator of the facility 102, or others may benefit from information or actions which are based on data obtained from the one or more sensors 120. For example, a pick list may be presented to the user 116 for items 104 that are in inventory locations 114 near a current location of the user 116 in the facility 102.

The inventory management system 122 may use physical layout data 124 during operation. The physical layout data 124 comprises information about the physical configuration of the facility 102 or portions thereof. For example, the physical layout data 124 may include electronic representations of the physical structures in the facility 102, such as computer aided design (CAD) data of the aisle 112 configurations, inventory locations 114, information about which items 104 are in what inventory locations 114, real coordinates of the sensors 120, and so forth. The physical layout data 124 may include information about the presence of walls, heating, ventilation, and air conditioning (HVAC) equipment, location of doors and windows, furniture, and so forth.

The inventory management system 122 may access the sensor data 126 comprising information acquired by the one or more sensors 120. For example, sensor data 126 may comprise images acquired by the imaging sensors 120(1), touchpoint data from touchpoint sensors, weight data from weight sensors, and so forth.

Each imaging sensor 120(1) may exhibit a field of view (FOV) 128, which includes a portion of a scene in the facility 102. For example, the field of view 128 of an overhead imaging sensor 120(1) may comprise a portion of the aisle 112.

The inventory management system 122 may use the physical layout data 124 and the sensor data 126 to generate process data about the facility 102. For example, the inventory management system 122 may use image data from the imaging sensors 120(1) to generate tracking data as the user 116 moves throughout the facility 102, touchpoint data from touchpoint sensors to determine which item 104 the user 116 has interacted with, and so forth.

The sensor data 126 may be processed by the inventory management system 122 to generate synchronized data 130. The synchronized data 130 may comprise frames or data derived therefrom that occur within a time window of one another. In some implementations, synchronized data 130 may include a timestamp or other data indicative of a point in time or interval with which the synchronized data 130 is associated. For example, synchronized data 130 may include a timestamp indicative of the time of the oldest frame therein, a timestamp indicative of the time of the newest frame therein, a timestamp indicative of a time midway between the newest and oldest frames, and so forth.

By processing the synchronized data 130, the inventory management system 122 may determine the location of objects such as items 104, users 116, totes 118, and so forth. The inventory management system 122 may determine other information using the synchronized data 130. Generation of the synchronized data 130 is described below in more detail.

Figure 2:
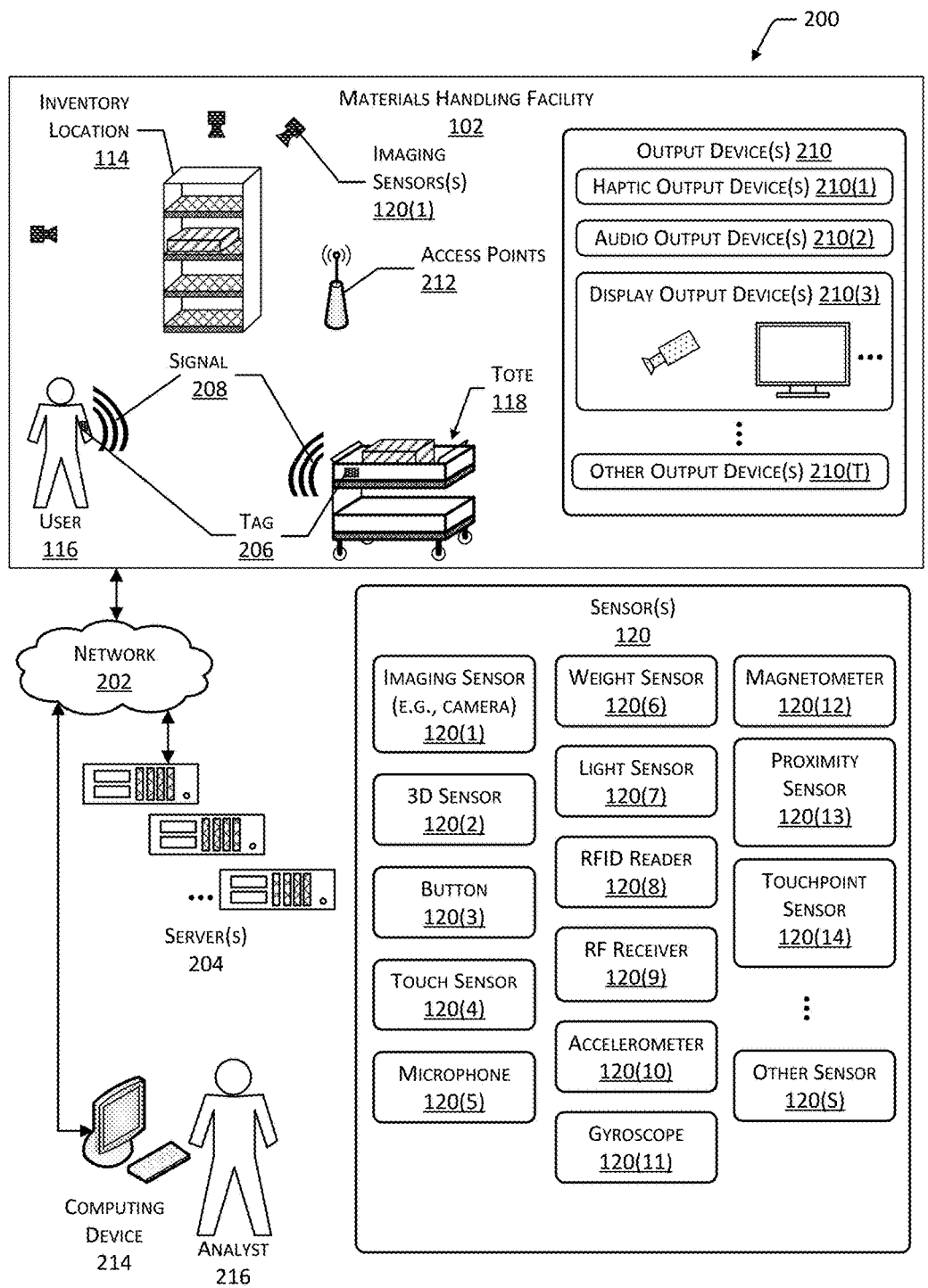
FIG. 2 is a block diagram illustrating additional details of the facility, according to some implementations.

FIG. 2 is a block diagram 200 illustrating additional details of the facility 102, according to some implementations. The facility 102 may be connected to one or more networks 202, which in turn connect to one or more servers 204. The network 202 may include private networks, public networks such as the Internet, or a combination thereof. The network 202 may utilize wired technologies (e.g., wires, fiber optic cable, and so forth), wireless technologies (e.g., radio frequency, infrared, acoustic, optical, and so forth), or other connection technologies. The network 202 is representative of any type of communication network, including one or more of data networks or voice networks.

The servers 204 may be configured to execute one or more modules or software applications associated with the inventory management system 122. While the servers 204 are illustrated as being in a location outside of the facility 102, in other implementations, at least a portion of the servers 204 may be located at the facility 102. The servers 204 are discussed in more detail below with regard to FIG. 3.

The users 116, the totes 118, or other objects in the facility 102 may be equipped with one or more tags 206. The tags 206 are configured to emit a signal 208. In one implementation, the tag 206 may be a radio frequency identification (RFID) tag configured to emit a RF signal 208 upon activation by an external signal. For example, the external signal may comprise a radio frequency signal or a magnetic field configured to energize or activate the RFID tag 206. In another implementation, the tag 206 may comprise a transmitter and a power source configured to power the transmitter. For example, the tag 206 may comprise a Bluetooth Low Energy (BLE) transmitter and battery. In other implementations, the tag 206 may use other techniques to indicate presence of the tag 206 to a corresponding sensor 120 or detector. For example, the tag 206 may be configured to generate an ultrasonic signal 208 that is detected by corresponding acoustic receivers. In yet another implementation, the tag 206 may be configured to emit an optical signal 208.

The inventory management system 122 may be configured to use the tags 206 for one or more of identification of the object, determining a location of the object, and so forth. For example, the users 116 may wear tags 206, the totes 118 may have tags 206 affixed, and so forth, that may be read and, based at least in part on signal strength, used to determine identity and location.

Generally, the inventory management system 122 or other systems associated with the facility 102 may include any number and combination of input components, output components, and servers 204.

The one or more sensors 120 may be arranged at one or more locations within the facility 102. For example, the sensors 120 may be mounted on or within a floor, wall, or ceiling, at an inventory location 114, on the tote(s) 118, may be carried or worn by the user(s) 116, and so forth. In some implementations at least a portion of the sensors 120 may be outside the facility 102.

The sensors 120 may include one or more imaging sensors 120(1). These imaging sensors 120(1) may include cameras configured to acquire images of a scene. The imaging sensors 120(1) may be configured to detect light in one or more wavelengths including, but not limited to, terahertz, infrared, visible, ultraviolet, and so forth. For example, the imaging sensors 120(1) may include a "red-green-blue" or "RGB" camera configured to produce visible light image data. The inventory management system 122 may use image data acquired by the imaging sensors 120(1) during operation of the facility 102. For example, the inventory management system 122 may identify items 104, users 116, totes 118, and so forth, based at least in part on their appearance within the image data.

One or more 3D sensors 120(2) may also be included in the sensors 120. The 3D sensors 120(2) are configured to acquire spatial or three-dimensional data, such as depth information, about objects within a sensor field of view 128. The 3D sensors 120(2) may include range cameras, lidar systems, sonar systems, radar systems, structured light systems, stereo vision systems, optical interferometry systems, coded aperture systems, and so forth.

The inventory management system 122 may use the three-dimensional data acquired to identify objects, determine one or more of a location, orientation, or position of an object, and so forth. The location may be described as where in space within the facility 102 an object is. For example, the location may be specified as X and Y coordinates relative to an origin, where X and Y are mutually orthogonal. In comparison, orientation may be indicative of a direction the object (or a portion thereof) is facing. For example, the orientation may be that the user 116 is facing south. Position may provide information indicative of a physical configuration or pose of the object, such as the arms of the user 116 are stretched out to either side. Pose may provide information on a relative configuration of one or more elements of an object. For example, the pose of the user's 116 hand may indicate whether the hand is open or closed. In another example, the pose of the user 116 may include how the user 116 is holding an item 104.

One or more buttons 120(3) may also be included in the sensors 120 and be configured to accept input from the user 116. The buttons 120(3) may comprise mechanical, capacitive, optical, or other mechanisms. For example, the buttons 120(3) may comprise mechanical switches configured to accept an applied force from a touch of the user 116 to generate an input signal. The inventory management system 122 may use data from the buttons 120(3) to receive information from the user 116. For example, the buttons 120(3) may be used to accept input from a user 116 such as a username and password associated with an account.

The sensors 120 may include one or more touch sensors 120(4). The touch sensors 120(4) may use resistive, capacitive, surface capacitance, projected capacitance, mutual capacitance, optical, Interpolating Force-Sensitive Resistance (IFSR), or other mechanisms to determine the point of a touch or near-touch. For example, the IFSR may comprise a material configured to change electrical resistance responsive to an applied force. The point of that change in electrical resistance within the material may indicate the point of the touch. The inventory management system 122 may use data from the touch sensors 120(4) to receive information from the user 116. For example, the touch sensor 120(4) may be integrated with the tote 118 to provide a touchscreen with which the user 116 may select from a menu one or more particular items 104 for picking, enter a manual count of items 104 at an inventory location 114, and so forth.

The sensors 120 may include one or more microphones 120(5) that may be configured to acquire audio data indicative of sound present in the environment. The sound may include user speech uttered by the user 116. In some implementations, arrays of microphones 120(5) may be used. These arrays may implement beamforming or other techniques to provide for directionality of gain. The inventory management system 122 may use the one or more microphones 120(5) to accept voice input from the users 116, determine the location of one or more users 116 in the facility 102, and so forth.

One or more weight sensors 120(6) may be configured to measure the weight of a load, such as the item 104, the user 116, the tote 118, and so forth. The weight sensors 120(6) may be configured to measure the weight of the load at one or more of the inventory locations 114, the tote 118, on the floor of the facility 102, and so forth. The weight sensors 120(6) may include one or more sensing mechanisms to determine weight of a load. These sensing mechanisms may include piezoresistive devices, piezoelectric devices, capacitive devices, electromagnetic devices, optical devices, potentiometric devices, microelectromechanical devices, load cells, pneumatic pressure sensors, and so forth. The sensing mechanisms may operate as transducers that generate one or more signals based on an applied force, such as that of the load due to gravity.

The sensors 120 may include one or more light sensors 120(7). The light sensors 120(7) may be configured to provide light sensor data indicative of ambient lighting conditions such as a level of illumination. Information acquired by the light sensors 120(7) may be used by the inventory management system 122 to adjust a level, intensity, or configuration of an output device 210 such as a display.

One more radio frequency identification (RFID) readers 120(8), near field communication (NFC) systems, and so forth, may also be provided as sensors 120. For example, the RFID readers 120(8) may be configured to read the RF tags 206. RFID data acquired by the RFID reader 120(8) may be used by the inventory management system 122 to identify an object associated with the RF tag 206 such as the item 104, the user 116, the tote 118, and so forth.

One or more RF receivers 120(9) may also be included as sensors 120. In some implementations, the RF receivers 120(9) may be part of transceiver assemblies. The RF receivers 120(9) may be configured to acquire RF signals 208 associated with Wi-Fi, Bluetooth, ZigBee, 3G, 4G, LTE, or other wireless data transmission technologies and generate RF data. The RF receivers 120(9) may provide information associated with data transmitted via radio frequencies, signal strength of RF signals 208, and so forth. For example, RF data from the RF receivers 120(9) may be used by the inventory management system 122 to determine a location of an RF source, such as a device carried by the user 116.

The sensors 120 may include one or more accelerometers 120(10), which may be worn or carried by the user 116, mounted to the tote 118, and so forth. The accelerometers 120(10) may provide information such as the direction and magnitude of an imposed acceleration. Data such as rate of acceleration, determination of changes in direction, speed, and so forth, may be determined using the accelerometers 120(10).

A gyroscope 120(11) may provide information indicative of rotation of an object affixed thereto. For example, the tote 118 or other objects or devices may be equipped with a gyroscope 120(11) to provide data indicative of a change in orientation.

A magnetometer 120(12) may be used to determine a heading by measuring ambient magnetic fields, such as the terrestrial magnetic field. The magnetometer 120(12) may be worn or carried by the user 116, mounted to the tote 118, and so forth. For example, the magnetometer 120(12) as worn by the user 116(1) may act as a compass and provide information indicative of which way the user 116(1) is facing.

A proximity sensor 120(13) may be used to determine presence of an object, such as the user 116, the tote 118, and so forth. The proximity sensors 120(13) may use optical, electrical, ultrasonic, electromagnetic, or other techniques to determine a presence of an object. In some implementations, the proximity sensors 120(13) may use an optical emitter and an optical detector to determine proximity. For example, an optical emitter may emit light, a portion of which may then be reflected by the object back to the optical detector to provide an indication that the object is proximate to the proximity sensor 120(13). In other implementations, the proximity sensors 120(13) may comprise a capacitive proximity sensor 120(13) configured to provide an electrical field and determine a change in electrical capacitance due to presence or absence of an object within the electrical field.

The proximity sensors 120(13) may be configured to provide sensor data 126 indicative of one or more of a presence or absence of an object, a distance to the object, characteristics of the object, and so forth. An optical proximity sensor 120(13) may use time-of-flight (ToF), structured light, interferometry, or other techniques to generate the distance data. For example, ToF determines a propagation time (or "round-trip" time) of a pulse of emitted light from an optical emitter or illuminator that is reflected or otherwise returned to an optical detector. By dividing the propagation time in half and multiplying the result by the speed of light in air, the distance to an object may be determined. In another implementation, a structured light pattern may be provided by the optical emitter. A portion of the structured light pattern may then be detected on the object using an imaging sensor 120(1) such as a camera. Based on an apparent distance between the features of the structured light pattern, the distance to the object may be calculated. Other techniques may also be used to determine distance to the object. In another example, the color of the reflected light may be used to characterize the object, such as skin, clothing, tote 118, and so forth. In some implementations, a proximity sensor 120(13) may be installed at the inventory location 114.

A touchpoint sensor 120(14) is configured to generate touchpoint data indicative of a touch by one object with another or proximity of two objects deemed to constitute a touch. For example, the touchpoint data may be indicative of a touch provided by a hand or a portion of the hand of the user 116 coming into physical contact with an item 104 or an inventory location 114. In another example, the touch may comprise the two objects being proximate to one another, such as the hand or the portion of the hand of the user 116 coming to within 6 centimeters (cm) of the item 104 or the inventory location 114. The touchpoint sensors 120(14) may be configured to generate touchpoint data for a particular inventory location 114 (such as a shelf on a rack), a grouping of inventory locations 114 (such as the rack of shelves), and so forth.

In one implementation, the touchpoint sensor 120(14) may utilize a linear array of light emitters and a corresponding linear array of light detectors. For example, the light emitters may comprise a line of infrared light emitting diodes (LEDs) or vertical cavity surface emitting lasers (VCSELs) that are arranged above a top shelf in front of the inventory location 114. The light detectors comprise a line of photodiodes sensitive to infrared light arranged below the light emitters. The light emitters produce a "lightplane" or sheet of infrared light that is then detected by the light detectors. An object passing through the lightplane may decrease the amount of light falling upon the light detectors. For example, the user's 116 hand passing through the lightplane would prevent some light from the light emitters from reaching a corresponding light detector. As a result, a position along the linear array of the object that blocked the light (such as the hand of the user 116) may be determined. This position may be expressed as the touchpoint data, with the touchpoint being indicative of the intersection between the hand of the user 116 and the sheet of infrared light. In some implementations, a pair of touchpoint sensors 120(14) may be arranged at right angles relative to one another to provide two-dimensional touchpoint data indicative of a position of touch in a plane.

The sensors 120 may include other sensors 120(S) as well. For example, the other sensors 120(S) may include ultrasonic rangefinders, thermometers, barometric sensors, hygrometers, vibration sensors, biometric input devices, and so forth. Continuing the example, the biometric input devices may include, but are not limited to, fingerprint readers, palm scanners, and so forth.

Output devices 210 may also be provided in the facility 102. The output devices 210 may be configured to generate signals that may be perceived by the user 116.

Haptic output devices 210(1) may be configured to provide a signal that results in a tactile sensation to the user 116. The haptic output devices 210(1) may use one or more mechanisms such as electrical stimulation or mechanical displacement to provide the signal. For example, the haptic output devices 210(1) may be configured to generate a modulated electrical signal that produces an apparent tactile sensation in one or more fingers of the user 116. In another example, the haptic output devices 210(1) may comprise piezoelectric or rotary motor devices configured to provide a vibration that may be felt by the user 116.

One or more audio output devices 210(2) may be configured to provide acoustic output. The acoustic output includes one or more of infrasonic sound, audible sound, or ultrasonic sound. The audio output devices 210(2) may use one or more mechanisms to generate sound. These mechanisms may include, but are not limited to, the following: voice coils, piezoelectric elements, magnetorestrictive elements, electrostatic elements, and so forth. For example, a piezoelectric buzzer or a speaker may be used to provide acoustic output.

The display output devices 210(3), such as a display panel, may be configured to provide output that may be seen by the user 116 or detected by a light-sensitive detector such as an imaging sensor 120(1) or light sensor 120(7). The output from the display output devices 210(3) may be monochrome or color. The display output devices 210(3) may be emissive, reflective, or both emissive and reflective. An emissive display output device 210(3) is configured to emit light during operation. For example, an LED is an emissive display output device 210(3). In comparison, a reflective display output device 210(3) relies on ambient light to present an image. For example, an electrophoretic display is a reflective display output device 210(3). Backlights or front lights may be used to illuminate the reflective display output device 210(3) to provide visibility of information in conditions where the ambient light levels are low.

Mechanisms of the display output devices 210(3) may include liquid crystal displays, transparent organic LEDs, electrophoretic displays, image projectors, or other display mechanisms. The other display mechanisms may include, but are not limited to, micro-electromechanical systems (MEMS), spatial light modulators, electroluminescent displays, quantum dot displays, liquid crystal on silicon (LCOS) displays, cholesteric displays, interferometric displays, and so forth. These mechanisms are configured to emit light, modulate incident light emitted from another source, or both.

The display output devices 210(3) may be configured to present images. For example, the display output devices 210(3) may comprise a pixel-addressable display. The image may comprise at least a two-dimensional array of pixels or a vector representation of an at least two-dimensional image.

In some implementations, the display output devices 210(3) may be configured to provide non-image data, such as text characters, colors, and so forth. For example, a segmented electrophoretic display, segmented LED, and so forth, may be used to present information such as a stock keeping unit (SKU) number. The display output devices 210(3) may also be configurable to vary the color of the text, such as using multicolor LED segments.

In some implementations, the display output devices 210(3) may be configurable to provide image or non-image output. For example, an electrophoretic display output device 210(3) with addressable pixels may be used to present images of text information or all of the pixels may be set to a solid color to provide a colored panel.

The display output devices 210(3) may be configured to maintain presentation of an image without ongoing application of electrical power. For example, the electrophoretic display output device 210(3) may be able to maintain a particular configuration of electrophoretic elements in the absence of power, allowing ongoing presentation when power is removed. In another example, cholesteric displays 210(3) may be configured to continue presentation of information after power is removed. In some implementations, these displays may be referred to a "stable" or "bistable" displays.

The output devices 210 may include hardware processors, memory, and other elements configured to present a user interface. In one implementation, the display output devices 210(3) may be arranged along the edges of inventory locations 114. For example, the display output devices 210(3) on the edge of the inventory locations 114 may present information about the items 104 stowed therein.

Other output devices 210(T) may also be present at the facility 102. The other output devices 210(T) may include lights, scent/odor dispensers, document printers, three-dimensional printers or fabrication equipment, and so forth. For example, the other output devices 210(T) may include lights that are located on the inventory locations 114, the totes 118, and so forth.

The facility 102 may include one or more access points 212 configured to establish one or more wireless networks. The access points 212 may use Wi-Fi, NFC, Bluetooth, or other technologies to establish wireless communications between a device and the network 202. The wireless networks allow the devices to communicate with one or more of the inventory management system 122, the sensors 120, the tags 206, communication devices of the totes 118, or other devices. In other implementations, a wired networking infrastructure may be implemented. For example, cabling may be used to provide Ethernet local area network connectivity.

Coupled to the network 202 may be one or more computing devices 214. The computing devices 214 may include desktop computers, tablet computers, smart phones, and so forth. An analyst 216 may use the computing device 214 to access one or more functions associated with the facility 102. For example, the analyst 216 may use the computing device 214 to access information based on the synchronized data 130. Continuing the example, the analyst 216 may view an aggregate image stitched together from the images acquired by imaging sensors 120(1) that were obtained within the time window associated with the synchronized data 130. The analyst 216 may comprise a software developer, hardware developer, system administrator, maintenance personnel, end user, and so forth.

Figure 3:
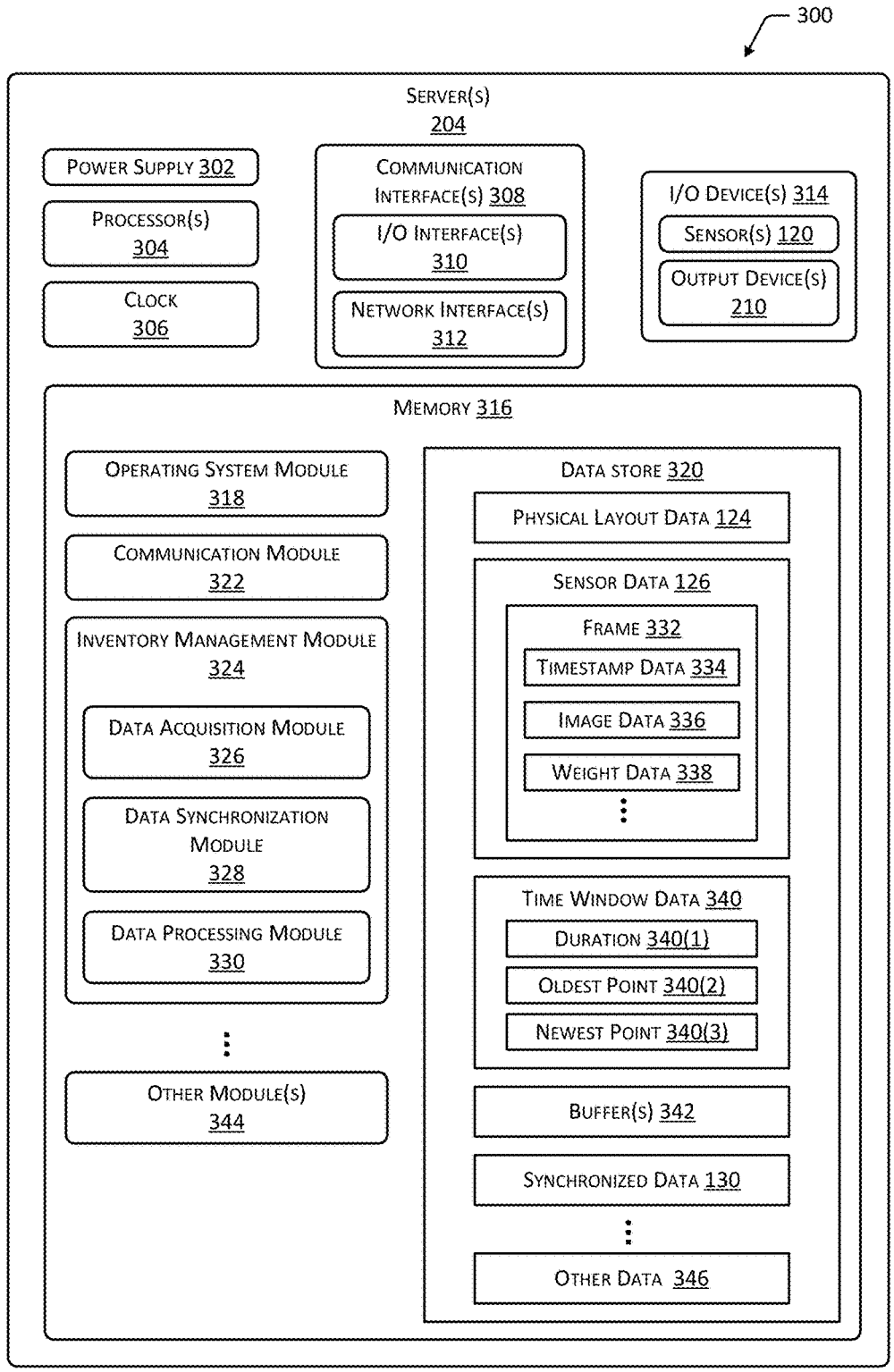
FIG. 3 illustrates a block diagram of a server configured to support operation of the facility, according to some implementations.

FIG. 3 illustrates a block diagram 300 of a server 204 configured to support operation of the facility 102, according to some implementations. The server 204 may be physically present at the facility 102, may be accessible by the network 202, or a combination of both. The server 204 does not require end-user knowledge of the physical location and configuration of the system that delivers the services. Common expressions associated with the server 204 may include "on-demand computing", "software as a service (SaaS)", "platform computing", "network-accessible platform", "cloud services", "data centers", and so forth. Services provided by the server 204 may be distributed across one or more physical or virtual devices.

One or more power supplies 302 are configured to provide electrical power suitable for operating the components in the server 204. The server 204 may include one or more hardware processors 304 (processors) configured to execute one or more stored instructions. The processors 304 may comprise one or more cores. The cores may be of one or more types. For example, the processors 304 may include application processor units, graphic processing units, and so forth. One or more clocks 306 may provide information indicative of date, time, ticks, and so forth. For example, the processor 304 may use data from the clock 306 to generate timestamps, trigger a preprogrammed action, and so forth.

The server 204 may include one or more communication interfaces 308, such as input/output (I/O) interfaces 310, network interfaces 312, and so forth. The communication interfaces 308 enable the server 204, or components thereof, to communicate with other devices or components. The communication interfaces 308 may include one or more I/O interfaces 310. The I/O interfaces 310 may comprise Inter-Integrated Circuit (I2C), Serial Peripheral Interface bus (SPI), Universal Serial Bus (USB) as promulgated by the USB Implementers Forum, RS-232, and so forth.

The I/O interface(s) 310 may couple to one or more I/O devices 314. The I/O devices 314 may include input devices such as one or more of a sensor 120, keyboard, mouse, scanner, and so forth. The I/O devices 314 may also include output devices 210 such as one or more of a display output device 210(3), printer, audio speaker, and so forth. In some embodiments, the I/O devices 314 may be physically incorporated with the server 204 or may be externally placed.

The network interfaces 312 are configured to provide communications between the server 204 and other devices, such as totes 118, routers, access points 212, and so forth. The network interfaces 312 may include devices configured to couple to personal area networks (PANs), local area networks (LANs), wide area networks (WANs), and so forth. For example, the network interfaces 312 may include devices compatible with Ethernet, Wi-Fi, Bluetooth, ZigBee, and so forth.

The server 204 may also include one or more busses or other internal communications hardware or software that allow for the transfer of data between the various modules and components of the server 204.

As shown in FIG. 3, the server 204 includes one or more memories 316. The memory 316 comprises one or more non-transitory computer-readable storage media (CRSM). The CRSM may be any one or more of an electronic storage medium, a magnetic storage medium, an optical storage medium, a quantum storage medium, a mechanical computer storage medium, and so forth. The memory 316 may provide storage of computer-readable instructions, data structures, program modules, and other data for the operation of the server 204. A few example functional modules are shown stored in the memory 316, although the same functionality may alternatively be implemented in hardware, firmware, or as a system on a chip (SoC).

The memory 316 may include at least one operating system (OS) module 318. The OS module 318 is configured to manage hardware resource devices such as the communication interfaces 308, the I/O interfaces 310, the I/O devices 314, and provide various services to applications or modules executing on the processors 304. The OS module 318 may implement a variant of the FreeBSD operating system as promulgated by the FreeBSD Project; other UNIX or UNIX-like variants; a variation of the Linux operating system as promulgated by Linus Torvalds; the Windows operating system from Microsoft Corporation of Redmond, Wash., USA; and so forth.

Also stored in the memory 316 may be a data store 320 and one or more of the following modules. These modules may be executed as foreground applications, background tasks, daemons, and so forth. The data store 320 may use a flat file, database, linked list, tree, executable code, script, or other data structure to store information. In some implementations, the data store 320 or a portion of the data store 320 may be distributed across one or more other devices including the servers 204, network attached storage devices, and so forth.

A communication module 322 may be configured to establish communications with one or more of the totes 118, sensors 120, other servers 204, or other devices. The communications may be authenticated, encrypted, and so forth.

The memory 316 may store an inventory management module 324. The inventory management module 324 may be configured to provide the inventory functions as described herein with regard to the inventory management system 122. For example, the inventory management module 324 may track items 104 between different inventory locations 114, to and from the totes 118, and so forth. Operation of the inventory management module 324 may use sensor data 126 obtained from the sensors 120.

The inventory management module 324 may include one or more of a data acquisition module 326, a data synchronization module 328, or a data processing module 330. The data acquisition module 326 may be configured to acquire and access information associated with operation of the facility 102. For example, the data acquisition module 326 may acquire the sensor data 126 from the sensors 120.

The data synchronization module 328 is configured to generate synchronized data 130. For example, the data synchronization module 328 may generate synchronized data 130 from the frames received from a plurality of sensors 120. As described above, the synchronized data 130 may comprise frames (or data derived therefrom) that occur within a time window of one another. The data synchronization module 328 may be configured to generate synchronized data 130 for a subset of the sensors 120, such as a sensor cluster. The sensor cluster may comprise sensors 120 that share a common area of coverage, such as gathering information in a particular aisle 112, at a particular inventory location 114, having FOV 128 that overlap, and so forth. In some implementations, the data synchronization module 328 may generate synchronized data 130 for groups of sensor clusters. For example, the data synchronization module 328 may use the techniques described in this disclosure to provide synchronized data 130 across the entire facility 102. The process of generating synchronized data 130 is described in more detail below with regard to FIGS. 6-10.

The synchronization module 328 may access physical layout data 124 and sensor data 126 during operation. The physical layout data 124 may be used to determine sensor clusters. For example, the inventory management module 324 may designate as sensor clusters those sensors 120 that obtain information about a common or adjacent space within the facility 102. Feeds of frames from sensors 120 within a particular sensor cluster may be processed by the synchronization module 328 to produce synchronized data 130 for that area.

The synchronization module 328 may access time window data 340 to generate the synchronized data 130. The time window data 340 may include a duration 340(1) and two endpoints, an oldest point 340(2) and a newest point 340(3). The duration 340(1) may indicate the width or time interval that the time window spans. The oldest point 340(2) and the newest point 340(3) bound or define the time window used by the synchronized module 328. When the duration 340(1) of the time window is specified, and given a particular newest point 340(3), the oldest point 340(2) may be determined, or vice versa.

The duration 340(1) may be fixed or dynamically adjustable. For example, the duration 340(1) may be fixed by an administrator at 70 ms. The oldest point 340(2) of the time window indicates a point in time at which the time window begins while the newest point 340(3) indicates a point in time at which the time window ends. In some implementations, the newest point 340(3) may be limited to current time. Placement of the time window is described below in more detail with regard to FIGS. 6-10.

The frames 332 received from the sensors 120 may be stored in one or more buffers 342. In one implementation, a separate buffer 342 may be designated for use by a particular feed or set of frames 332 received from a particular sensor 120. For example, a sensor cluster may have three imaging sensors 120(1). Frames 332(1) from a first imaging sensor 120(1)(1) may be stored in a first buffer 342(1), frames 332(2) from a second imaging sensor 120(1)(2) may be stored in a second buffer 342(2), and frames 332(3) from a third imaging sensor 120(1)(3) may be stored in a third buffer 342(3). In another implementation, a single buffer 342 may be used to store incoming frames 332 from all feeds. The frames 332 may be tagged or otherwise tracked to indicate the source sensor device 120 or feed to which they are associated.

In some implementations, the payload of the frames 332 may be stored in a separate memory location other than the buffer(s) 342. For example, header information such as a frame identifier and the timestamp data 334 may be stored in the buffers 342 for processing by the synchronization module 328. Once the synchronized data 130 has been determined, the corresponding payload such as image data 336 or weight data 338 may be retrieved from the separate memory location outside of the buffer 342.

The data processing module 330 may process the sensor data 126, the synchronized data 130, or a combination thereof. For example, the sensor data 126 may comprise frames 332. Each frame 332 may include one or more of timestamp data 334, image data 336, weight data 338, non-weight data, and so forth.

The timestamp data 334 may comprise information indicative of time of creation of the frame 332 or a payload therein, as determined from a clock. For example, a clock onboard the sensor 120 may provide time data used to generate the timestamp data 334 indicative of when data was acquired by the sensor 120. In another example, the timestamp data 334 may indicate a time the frame 332 was received, such as at the server 204.

The image data 336 may comprise images acquired by an imaging sensor 120(1), generated by a 3D sensor 120(2), and so forth. For example, the image data 336 may comprise a bitmap of an image or video.

The weight data 338 may comprise information generated by one or more weight sensors 120(6). For example, the weight data 338 may indicate a total weight, net weight (total weight minus tare weight) and so forth. In some implementations, the weight data 338 may be from more than one weight sensor 120(6), such as a sum of the weights reported by two or more load cells.

The frame 332 may include other data, such as a sensor identifier. The sensor identifier may provide information indicative of a location of the sensor 120 within the facility 102. For example, the sensor identifier may indicate "aisle 112(1), inventory location 114(27), shelf 5, section A". The sensor identifier may provide information distinguishing one sensor 120 from another. For example, the sensor identifier may comprise a media access control (MAC) address of the network interface of the weight sensor 120(6).

In situations where the frames 332 comprise image data 336, the data processing module 330 may perform one or more image processing functions using one or more of the following tools or techniques. The image processing functions may be used to identify objects, such as users 114, items 104, totes 116, and so forth.

The image processing functions may be performed, at least in part, using one or more tools available in the OpenCV library as developed by Intel Corporation of Santa Clara, Calif., USA; Willow Garage of Menlo Park, Calif., USA; and Itseez of Nizhny Novgorod, Russia, with information available at www.opencv.org. In another implementation, functions available in the OKAO machine vision library as promulgated by Omron Corporation of Kyoto, Japan, may be used to process the image data 336. In another implementation, the EyeFace SDK as promulgated by Eyedea Recognition Ltd. of Prague, Czech Republic, may be used to process the image data 336. The OpenBR library and tools as originated by MITRE Corporation of Bedford, Mass., USA, and McLean, Va., USA, and promulgated by the OpenBR group at openbiometrics.org may also be used in some implementation for image processing.

In some implementations, the data processing module 330 may perform facial recognition. For example, facial recognition may be used to identify the user 116. Facial recognition may include analyzing facial characteristics that are indicative of one or more facial features in an image, three-dimensional data, or both. For example, the face of the user 116 may be detected within one or more of images in the image data 336. The facial features include measurements of, or comparisons between, facial fiducials or ordinal points. The facial features may include eyes, mouth, lips, nose, chin, ears, face width, skin texture, three-dimensional shape of the face, presence of eyeglasses, and so forth. In some implementations, the facial characteristics may include facial metrics. The facial metrics indicate various ratios of relative sizes and spacing of the facial features. For example, the facial metrics may include a ratio of interpupillary distance to facial width, ratio of eye width to nose width, and so forth. In some implementations, the facial characteristics may comprise a set of eigenvectors by using principal component analysis (PCA) on a set of images. These eigenvectors, as descriptive of a human face, may be known as "eigenfaces" or "eigenimages".

The identification process using facial recognition may include comparing the eigenvectors of an image with those previously stored as facial characteristics to determine identity of the user 116. For example, the face of the user 116 may be identified using the "FaceRecognizer" class of the OpenCV library. The results may then be stored as identification data (not shown) in the data store 320.

In other implementations, other techniques may be used to recognize faces. Previously stored registration data may associate particular facial characteristics with a particular identity, such as represented by a user account. For example, the particular pattern of eigenvectors in the image may be sought in the previously stored data, and matches within a threshold tolerance may be determined to indicate identity of the user 116. The eigenvectors or other measurements may be compared with previously stored characteristics to determine the identity of the user 116 in the image or to distinguish one user 116 from another.

The data processing module 330 may perform clothing recognition to analyze image data 336 to determine what articles of clothing, ornamentation, and so forth, the user 116 is wearing or carrying in the facility 102. For example, clothing recognition may be used to identify the user 116. Skin and hair detection algorithms may be used to classify portions of the image that are associated with the user's 116 skin or hair. Items that are not skin and hair may be classified into various types of articles of clothing such as shirts, hats, pants, bags, and so forth. The articles of clothing may be classified according to function, position, manufacturer, and so forth. Classification may be based on clothing color, texture, shape, position on the user 116, and so forth. For example, classification may designate an article of clothing worn on the torso of a user 116 as a "blouse" while color or pattern information may be used to determine a particular designer or manufacturer. The determination of the article of clothing may use a comparison of information from the images with previously stored data. Continuing the example, the pattern of the blouse may have been previously stored along with information indicative of the designer or manufacturer.

In some implementations, identification of the user 116 may be based on the particular combination of classified articles of clothing. The clothing may be used to identify the user 116 or to distinguish one user 116 from another. For example, the user 116(1) may be distinguished from the user 116(2) based at least in part on the user 116(1) wearing a hat and a red shirt while the user 116(2) is not wearing a hat and is wearing a blue shirt.

The data processing module 330 may use gait recognition techniques to analyze one or more of images, three-dimensional data, or other data, to assess how a user 116 moves over time. The user 116 may be identified at least in part by their gait. Gait comprises a recognizable pattern of movement of the user's 116 body that is affected by height, age, and other factors. Gait recognition may analyze the relative position and motion of limbs of the user 116. Limbs may include one or more arms, legs, and (in some implementations) the head. In one implementation, edge detection techniques may be used to extract a position of one or more limbs of the user 116 in the series of images. For example, a main leg angle of a user's 116 leg may be determined, and based on the measurement of this main leg angle over time and from different points-of-view, a three-dimensional model of the leg motion may be generated. The change in position over time of the limbs may be determined and compared with previously stored information to determine an identity of the user 116 or to distinguish one user 116 from another.

In some implementations, identity may be based on a combination of these or other recognition techniques. For example, the user 116 may be identified based on clothing recognition, gait recognition, facial recognition, detection of tags 206, weight data 338 from weight sensors 120(6), and so forth. The different recognition techniques may be used in different situations or in succession. For example, clothing recognition and gait recognition may be used at greater distances between the user 116 and the imaging sensors 120(1) or when the user's 116 face is obscured from view by an imaging sensor 120(1). In comparison, as the user 116 approaches the imaging sensor 120(1) and their face is visible, facial recognition may be used. Once identified, such as by way of facial recognition, one or more of gait recognition or clothing recognition may be used to track the user 116 within the facility 102.

Other techniques such as artificial neural networks (ANN), active appearance models (AAM), active shape models (ASM), cascade classifiers, support vector machines, Haar detectors, local binary pattern (LBP) classifiers, and so forth, may also be used to process sensor data 126. For example, the ANN may be trained using a supervised learning algorithm such that object identifiers are associated with images of particular objects within training images provided to the ANN. Once trained, the ANN may be provided with the images and may provide, as output, the object identifier.

During operation, the data processing module 330 may access one or more data processing parameters that may be stored in the data store 320. The data processing parameters may be used to control operation of one or more portions of the data processing module 330. For example, the data processing parameters may specify parameters of an algorithm used to perform facial recognition on image data 336. In another example, the data processing parameters may comprise thresholds or other settings, such as affecting how the user 116 or other object is tracked within the facility 102. By changing one or more of the data processing parameters, operation of the data processing module 330 and corresponding functions of the inventory management module 324 may be modified.

The data processing module 330 processes at least a portion of sensor data 126 to produce processed data. For example, the processed data may comprise information indicative of a location of the user 116 within the facility 102, a user identity associated with a particular user 116, touchpoints based on data from touchpoint sensors 120(14), and so forth. The processed data (not shown) may be stored in the data store 320 and used for operation of the facility 102

Other modules 344 may also be present in the memory 316, as well as other data 346 in the data store 320. For example, the other modules 344 may include an accounting module. The accounting module may be configured to use the processed data to determine an account to bill for items 104 picked by a particular user 116. The other data 346 may comprise information such as billing account data, camera configuration data, and so forth.

Figure 4:
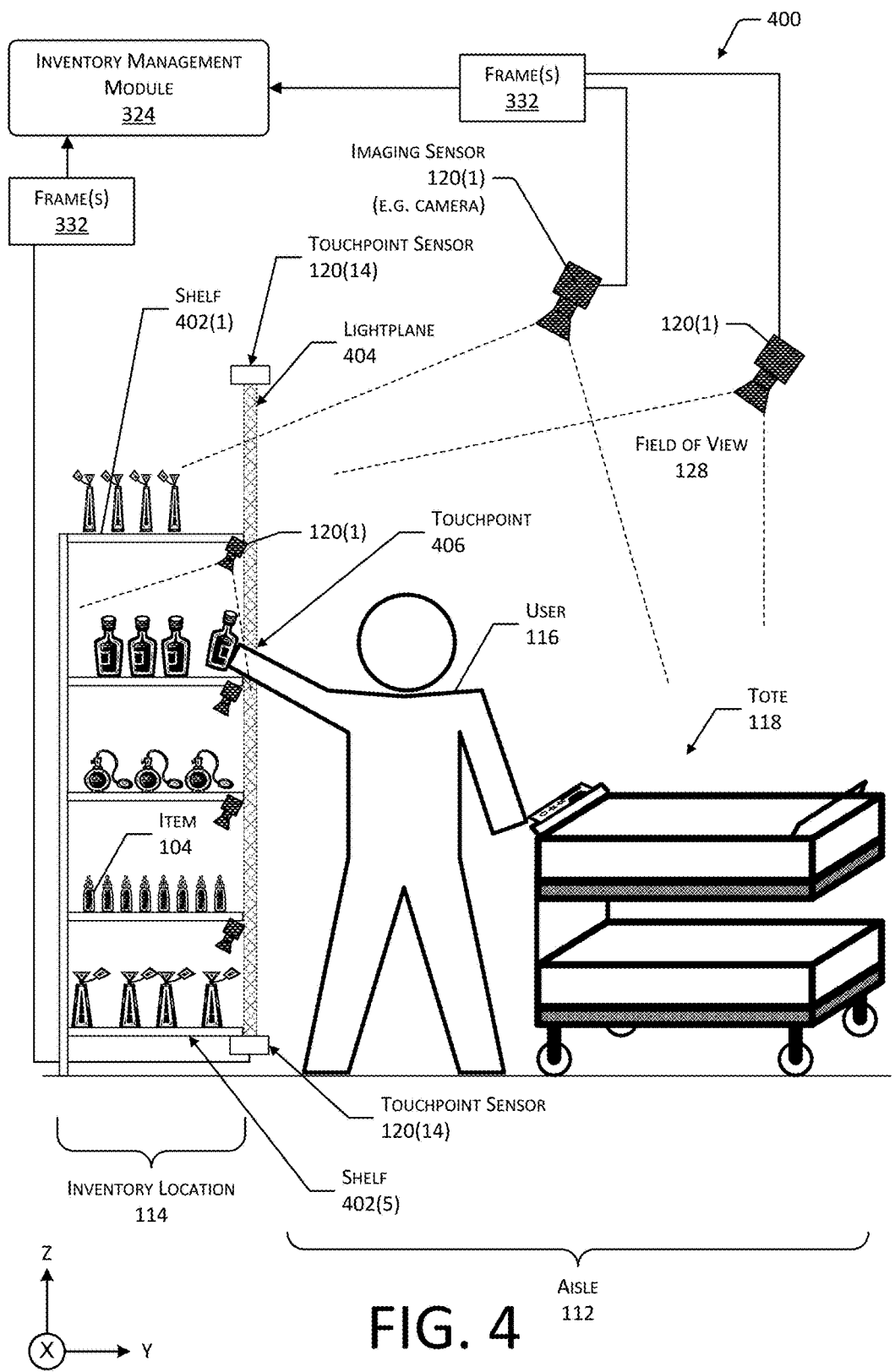
FIG. 4 illustrates a side view of a portion of the facility and sensors gathering sensor data, according to some implementations.

FIG. 4 illustrates a side view 400 of a portion of the facility 102. This illustration depicts inventory location 114 comprising shelves 402(1)-402(5) mounted to a rack. Each shelf 402 may have a shelf outer edge. For example, the shelf outer edge may be a portion of the shelf 402 that is proximate to the aisle 112.

One or more touchpoint sensors 120(14) may be arranged to provide a lightplane 404 between the shelf outer edge and where a user 116 may normally be expected within the aisle 112. For example, the light emitters of a touchpoint sensor 120(14) may be located above the outer edge of the top shelf 402(1) and may emit infrared light downwards, while the corresponding light detectors located below the lowermost shelf 402(5) detect, when unobstructed, the emitted infrared light.

The touchpoint sensor 120(14) provides sensor data 126 comprising touchpoint data, responsive to a touch of the user 116 (or another object). The touchpoint data is indicative of a position of a touchpoint 406. The touchpoint 406 may comprise a point in space at which a portion of the user 116 or another object intersects the light plane 404. The touch as indicated by the touchpoint 406 may thus be indicative of an actual point in three-dimensional space that is between the item 104 or the inventory location 114 and the user 116. For example, the touchpoint data may indicate a coordinate in one dimension, a pair of coordinates in two dimensions, and so forth.

The sensors 120 may be deployed throughout the facility 102. For example, the imaging sensors 120(1) may be deployed overhead, at the inventory locations 114, and so forth, to acquire image data 332 during operation of the facility 102. In another example, one or more weight sensors 120(6) may provide weight data 338 about an inventory location 114 or portion thereof, and so forth.

The sensor data 126 may then be used by the inventory management module 324 to facilitate operation of the facility 102. For example, the image of the user 116 removing an item 104 from the shelf 404(2) at inventory location 114 may be used to determine a pick, change item quantity information for the inventory location 114, assign a charge for the item 104 to a particular user 116, and so forth. In some implementations, the sensors 120 depicted in FIG. 4 may be part of a single sensor cluster. The feed of frames 332 provided by the sensors 120 may be processed by the synchronization module 328 to generate synchronized data 130. The synchronized data 130 may in turn be used by the data processing module 330. For example, the synchronized data 328 may be used to determine the location of an object during the time window.

Figure 5:
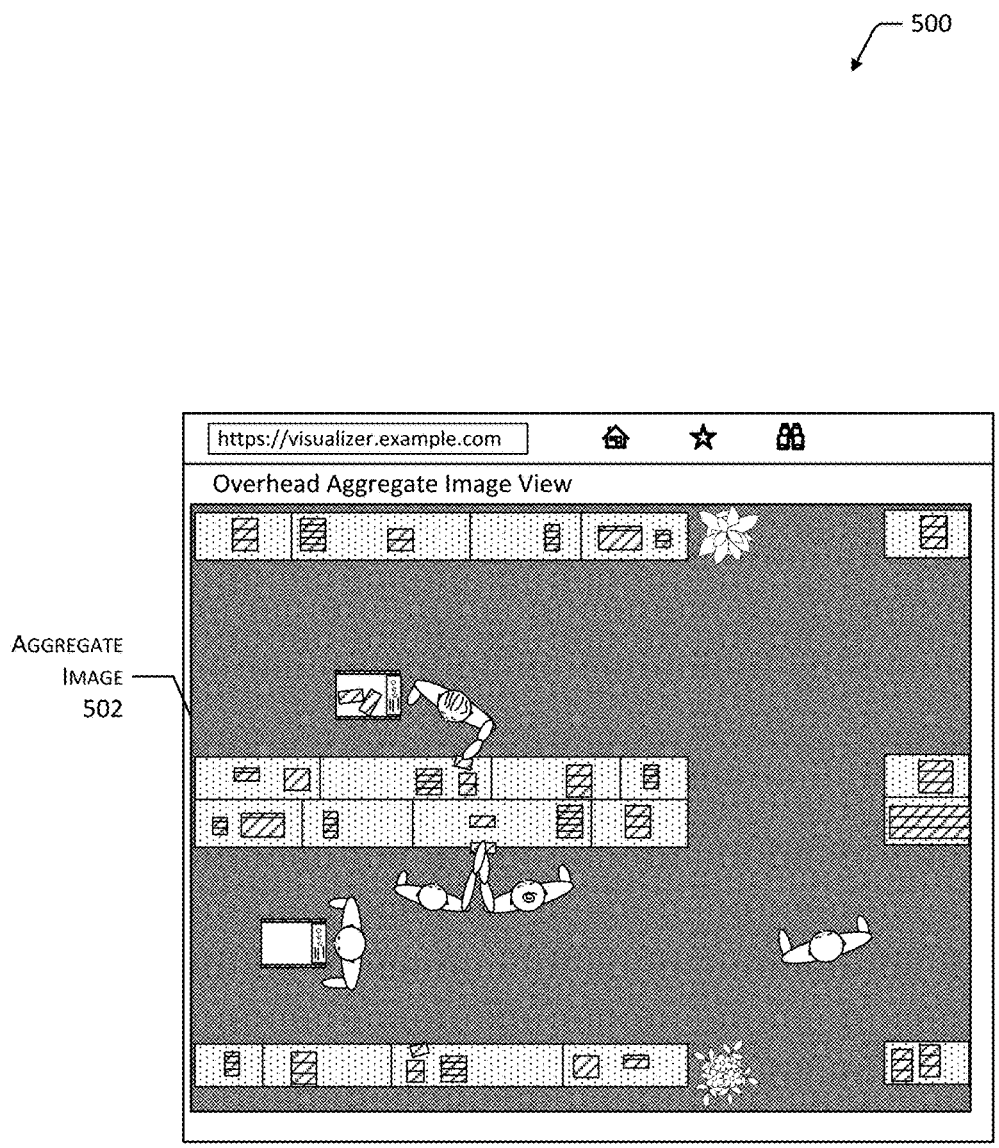
FIG. 5 illustrates a user interface presenting an aggregate image produced from synchronized data, according to some implementations.

FIG. 5 illustrates a user interface 500 comprising an aggregate image 502, according to some implementations. While the user interface 500 is depicted as being presented within a web browser, in other implementations, the user interface 500 may be provided by dedicated application, as a plug-in or enhancement of another tool, and so forth.

The data processing module 330 may use synchronized data 130 to generate the aggregate image 502. The aggregate image 502 results from the combination of a plurality of image data 336 that have been deemed synchronized. For example, the aggregate image 502 may comprise a plurality of images that have been joined together, merged into a single image, or otherwise arranged relative to one another. For example, the aggregate image 502 may be created by processing image data 336 from adjacent imaging sensors 120(1) using the OpenCV class "Stitcher" to detect portions of the image that correspond to one another and merging them together to form a composite image that includes a portion of the facility 102 that exceeds the field of view 128 of a single imaging sensor 120(1). In other implementations, the physical layout data 124 comprising information indicative of location within the facility 102 of the individual imaging sensors 120(1) may be used to provide for the relative arrangement of the image data 336. For example, the physical layout data 124 may indicate that imaging sensor 120(1)(11) is to the left of imaging sensor 120(1)(12), and the aggregate image 502 may be so configured.

The plurality of images may be acquired by different imaging sensors 120(1) having different fields of view 128. In some implementations, the plurality of images may be obtained from the synchronized data 130. The plurality of images may be stitched or otherwise assembled to provide a larger image of the facility 102, such as if a single imaging sensor 120(1) located high overhead was looking down with a field of view 128 encompassing the facility 102. When image data 336 is unavailable from a particular imaging sensor 120(1), in place of that unavailable image data 336, the aggregate image may present alternative data, such as the most recently available image, all black pixels, a crosshatch pattern, and so forth. For example, a portion of the aisle 112 that is in the field of view 128 of an inoperable imaging sensor 120(1) may be represented by a solid black area in the aggregate image 502.

The data processing module 330 may use the aggregate image 502 in various ways. For example, the aggregate image 502 may be processed using one or more computer vision techniques to determine information about objects in the facility 102 such as items 104, users 116, totes 118, and so forth. For example, the aggregate image 502 may be processed to identify and determine the location with the facility 102 of the users 116 at a given instant of time represented by the synchronized data 130. The identifying may include one or more of classifying an object as an item 104, user 116, tote 118, and so forth. The identifying may also include determination of a particular identifier with a particular object. For example, that the person standing in a particular location is user 116(1) "Marcus Smith" while the person standing at another particular location is user 116(2) "Rhonda Jones".

In some implementations, the data processing module 330 may perform other image processing operations on the image data 336. For example, a geometric image transform function may be applied to image data 336 to correct for variations in placement between imaging sensors 120(1), orientation of field of view 128, and so forth. Continuing the example, the OpenCV function "warpPerspective" may be used to perform the geometric image transform function.

Figure 6:
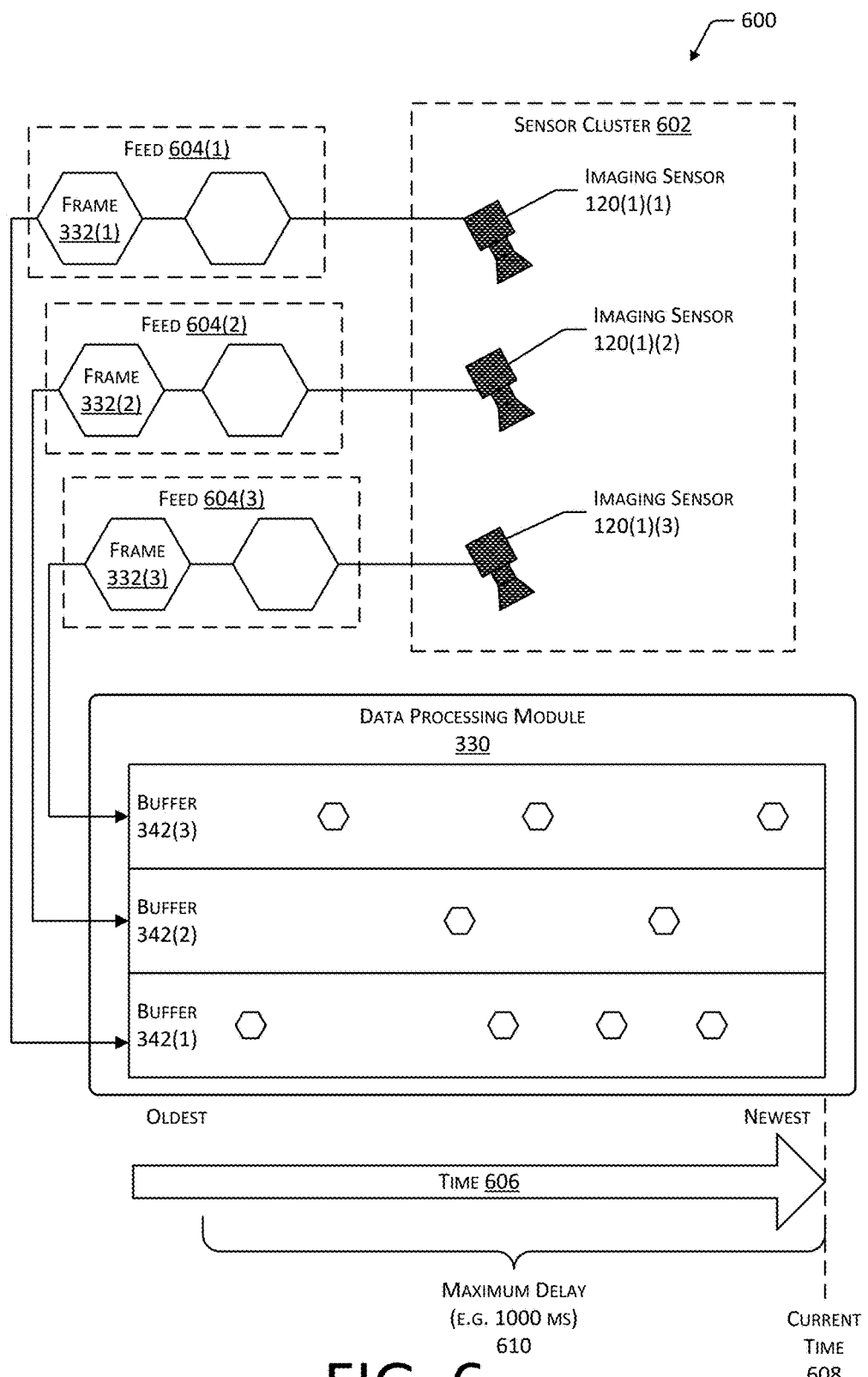
FIG. 6 illustrates a schematic of a sensor cluster providing a feed of frames to a data processing module configured to generate synchronized data, according to some implementations.

FIG. 6 illustrates a schematic 600 of a sensor cluster 602 providing a feed of frames 332 to a data processing module 330 configured to generate synchronized data 130, according to some implementations.

By way of illustration, and not necessarily as limitation, the sensor cluster 602 is presented in this figure as including three imaging sensors 120(1)(1), 120(1)(2), and 120(1)(3). Each sensor 120 within the sensor cluster 602 generates a feed 604 of one or more frames 332. The feed 604 may comprise a series of consecutive frames containing data. In some implementations, the set of frames 332 in the feed 604 may be considered a group of frames associated with a particular sensor 120. In some implementations the feed 604 may utilize one or more protocols such as HTTP Live Feeding (HLS), MPEG-DASH, and so forth to transport the frames 332. In other implementations, the feed 604 may comprise transmission of frames 332 using transmission control protocol, user datagram protocol, and so forth. The frames 332 in the feed 604 may be sent at regular intervals or irregular intervals. For example, the first imaging sensor 120(1)(1) may generate a feed 604(1) of frames 332 that include timestamp data 334 and image data 336 transferred using the HLS protocol. Likewise, the second imaging sensor 120(1)(2) may generate a feed 604(2), and the third imaging sensor 120(1)(3) may generate a feed 604(3). In another example, a first weight sensor 120(6)(1) may generate a series of frames 332 sent as UDP packets containing weight data. In some implementations, the frames 332 may include some indicia of the feed 604 to which they are associated, a sensor identifier indicative of the sensor 120 that generated the respective frames 332, and so forth.

In some implementations, a sensor cluster 602 may comprise a logical grouping of sensors 120 that is independent of their physical placement or function. For example, the imaging sensors 120(1) with FOVs 128 encompassing different points of entry to the facility 102 may be designated as sensor cluster 602.

The data processing module 330 may access the feeds 604. In the implementation depicted here, the frames 332 for each feed 604 are stored in a separate buffer 342. For example, the frames 332(1) from the first feed 604(1) are stored in the first buffer 342(1), the frames 332(2) from the second feed 604(2) are stored in the second buffer 342(2), and the frames 332(3) from the third feed 604(3) are stored in the third buffer 342(3).

Time 606 is indicated in this figure as an arrow, with time increasing left to right from oldest to newest. The newest time available may be current time 608. The frames 332 may be stored within their respective buffer 342 that is associated with a particular feed 604 as sequenced by their timestamp data 334. The timestamp data 334 may be indicative of the time the frame 332 was originated at the sensor 120, time the frame 332 was received by the server 204 or other device, and so forth. For example, as frames 332 are received, they may be inserted at the end of their respective buffer 342. In some implementations, the frames 332 within the buffer 342 may be sorted, such as in an ascending or descending order.

As described above, in some implementations, a single buffer 342 may be used. In this implementation, each frame 332 may comprise information indicative of the source sensor 120, feed 604, sensor cluster 602, and so forth.

In other implementations, other memory constructs may be used instead of or in addition to the buffer 342. For example, a linked list may be used in place of the buffer 342. In some implementations, the buffer 342 may comprise a dedicated memory device, or portion thereof. For example, the buffer 342 may be stored within a dedicated random access memory chip.

Maximum delay 610 may be specified for use by the synchronization module 328. The maximum delay 610 may be indicative of service level agreement, or other operational requirement for the facility 102 that indicates how "stale" or old the information in the synchronized data 130 is allowed to be. For example, the maximum delay 610 may specify 1 second. Should a portion of synchronized data 130 be greater than or otherwise at least partially outside of the maximum delay 610, the synchronization module 328 may perform one or more actions. For example, the synchronization module 328 may discard frames 332 that are older than the maximum delay 610, or more than 1 second older than the current time 608. For example, the discarded frames 332 may be deleted from or overwritten in the buffer 342. In other implementations, instead of discarding, frames 332 may be marked as unusable, tagged, disregarded, and so forth.

Figure 7:
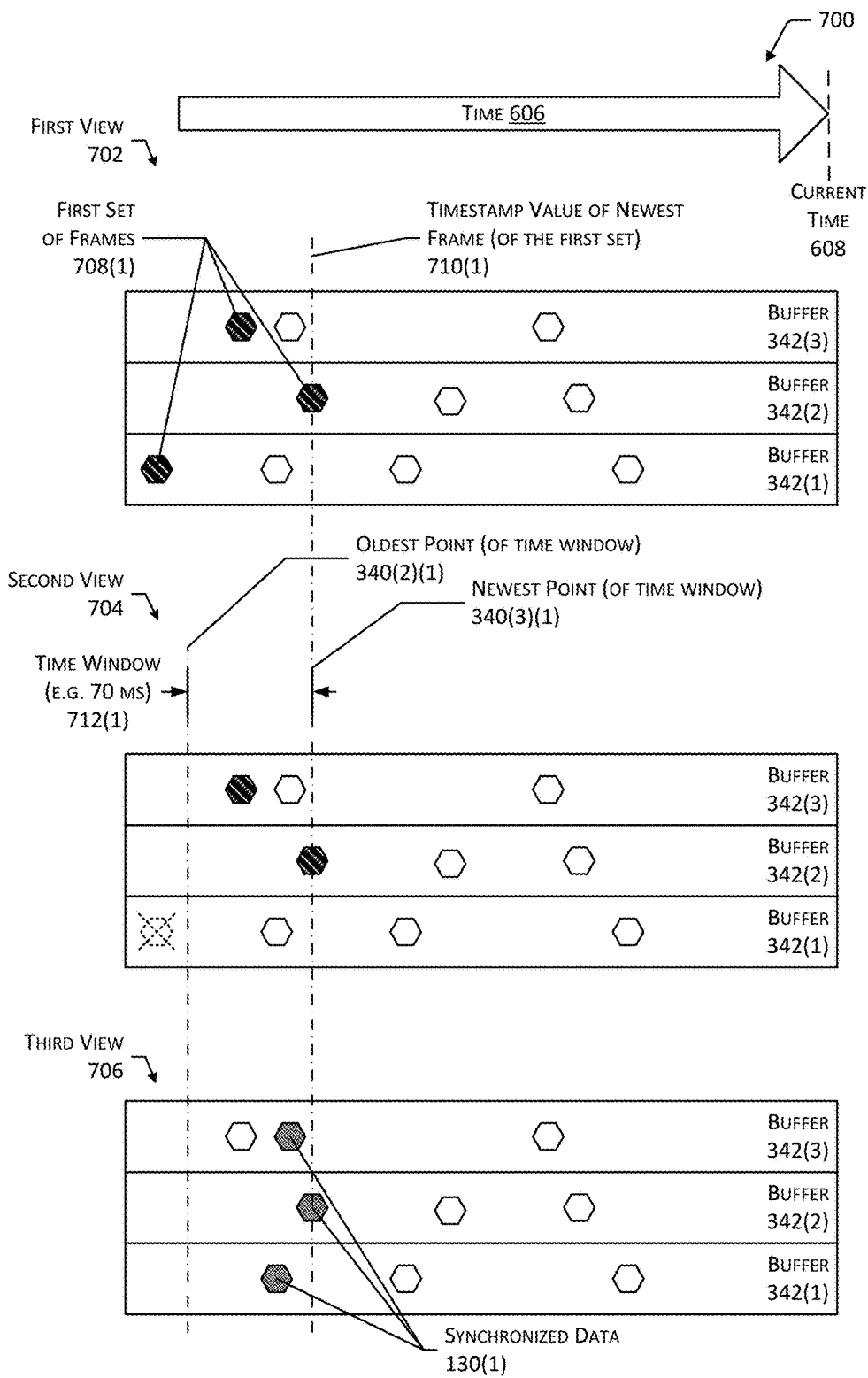
FIGS. 7-8 illustrate processing of frames stored in the buffers of the data processing module over time to generate synchronized data, according to some implementations.
Figure 8:
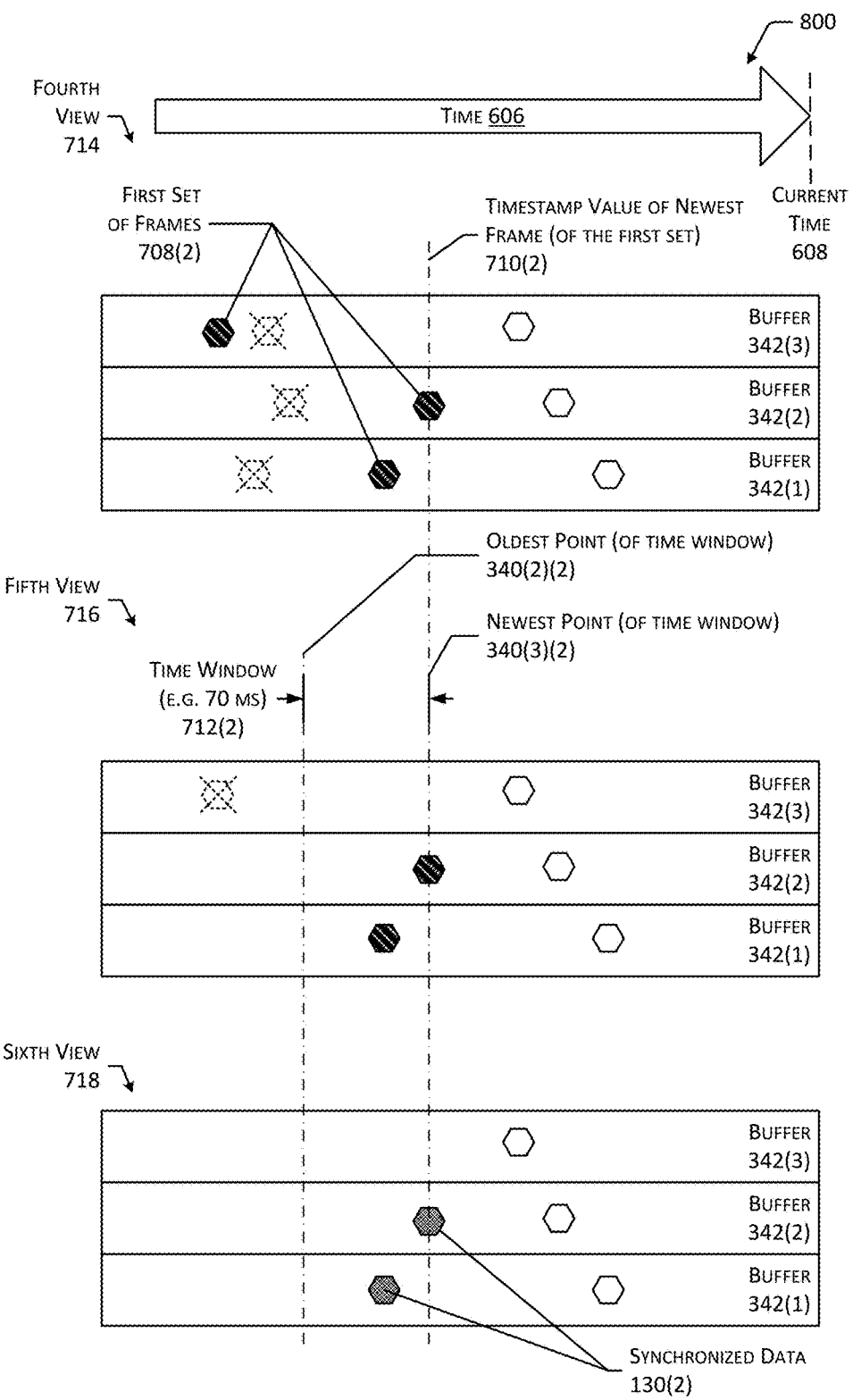

FIGS. 7-8 illustrate schematics 700 and 800 of processing frames 332 stored in the buffers 342 of the data processing module 330 over time to generate synchronized data 130, according to some implementations. As with FIG. 6, time 606 is indicated as increasing from left to right. Depicted in FIG. 7 are a first view 702, second view 704, and third view 706. Individual frames 332 are indicated by hexagons within respective buffers 342.

At the first view 702, a first set of frames 708(1) are designated. This first set of frames 708(1) comprises the oldest frames 332 for each of the buffers 342. In this figure, the first set of frames 708(1) are indicated by dark shading. Of the first set of frames 708(1), a timestamp value of a newest frame 710(1) is determined. For example, out of the three frames 332 in the first set of frames 708(1), the frame 332 in the second buffer 342(2) is the newest, or closest to current time 608.

At the second view 704, a first time window 712(1) has been designated. Characteristics of the time window 712 may be those set forth in the time window data 340. For example, the first time window 712(1) may have a duration 340(1) of 70 ms. The newest point 340(3) of the time window 712 may be specified by the timestamp value of the newest frame 710 of the first set. Given the specified duration 340(1) of the time window 712, the oldest point 340(2) of the time window 712 may be calculated. Continuing the example, given a duration 340(1) of 70 ms and the timestamp value of newest frame 710(1) is time=00:00:10.090 (hours:minutes:seconds), the newest point 340(3)(1) is designated at time=00:00:10.090 and the oldest point of the time window 340(2)(1) is 00:00:10.020 (that is, 00:00:10.090 minus 0.070 seconds).

The time window 712 and use thereof is described in this disclosure as an illustration, and not necessarily as a limitation. The explicit designation and use of the time window 712 may be included in or omitted from the processes described in this disclosure. In some implementations, the endpoints or an interval of time equivalent to the time window 712 may be used implicitly or indirectly. One implementation of this use is described below in more detail, such as with regard to FIG. 11.

Frames 332 that are older than the oldest point 340(2) may be discarded or disregarded. For example, the oldest frame of buffer 342(1) is older than the oldest point 340(2)(1) and may thus be discarded. Discarded frames 332 may be deleted or otherwise removed from the buffer 342. Disregarded frames 332 may be tagged or otherwise indicated such that they are only used under limited circumstances, or not at all.

At the third view 706, the newest frame for each of the buffers 342(1), 342(2), and 342(3) is designated as a part of the synchronized data 130. For example, the frames 332 for buffers 342(1) and 342(2) that are within the time window 712(1) are included in the synchronized data 130. However, buffer 342(3) has two frames 332 that are within the time window 712(1). Of these two frames 332, the newest frame 332 that is closest to current time 608 is included in the synchronized data 130(1). The other frame that is older may be disregarded. The synchronized data 130(1) may be sent to the data processing module 330 for further use.

Continuing to FIG. 8, a fourth view 714, fifth view 716, and sixth view 718 are further depicted.

At the fourth view 714, the frames 332 associated with previously determined synchronized data 130 may be discarded from their respective buffers 342. The process may continue, to designate a second first set of frames 708(2) that are the oldest frames for each of the buffers 342. A timestamp value of a newest frame of the first set 710(2) may be determined as described above.

At the fifth view 716, a second time window 712(2) is designated based on the second timestamp value of the newest frame 710(2). The second time window 712(2) has a corresponding newest point of the time window 340(3)(2) that is equal to the timestamp value of the newest frame of the first set 710(2), and an oldest point 340(2)(2) that is determined based on the duration 340(1). In this illustration, the oldest frame 332 in the buffer 342(3) is older than the oldest point 340(2)(2). As a result, this frame 332 may be disregarded or removed from the buffer.

At the sixth view 718, the frames 332 within the second time window 712(2) are designated as second synchronized data 130(2). In the implementation depicted here, the synchronized data 130(2) does not include frames 332 from each of the imaging sensors 120(1) in the sensor cluster 602. For example, a frame 332 from the imaging sensor 120(1)(3) having a timestamp that is within the time window 712(2) is not present. As a result, the synchronized data 130(2) consists of the frames 332 in the buffer 342(1) and the buffer 342(2).

In other implementations other techniques may be used to address late or missing frames 332. For example, one or more of the oldest point 340(2) or the newest point 340(3) may be shifted to earlier or later times. For example, the time interval of the time window 712 may remain fixed, but the newest point 340(3) may be advanced to a newer time. The time window 712 may be advanced a fixed amount of time, such as 1000 ms, or may be advanced a variable amount of time. For example, the time window 712 may be advanced until at least one frame 332 from each of the plurality of buffers 342 is present in the time window 712.

The second synchronized data 130(2) may be sent to the data processing module 330 for further use. Once sent or stored in another location, the frames 332 of the synchronized data 130 may be removed from the buffers 342.

As time progresses, additional frames 332 may be added to the buffers 342. For example, frames 332 from feeds 604 may be received and inserted at the end or newest portion of the buffer 342.

Illustrative Processes

Figure 9:
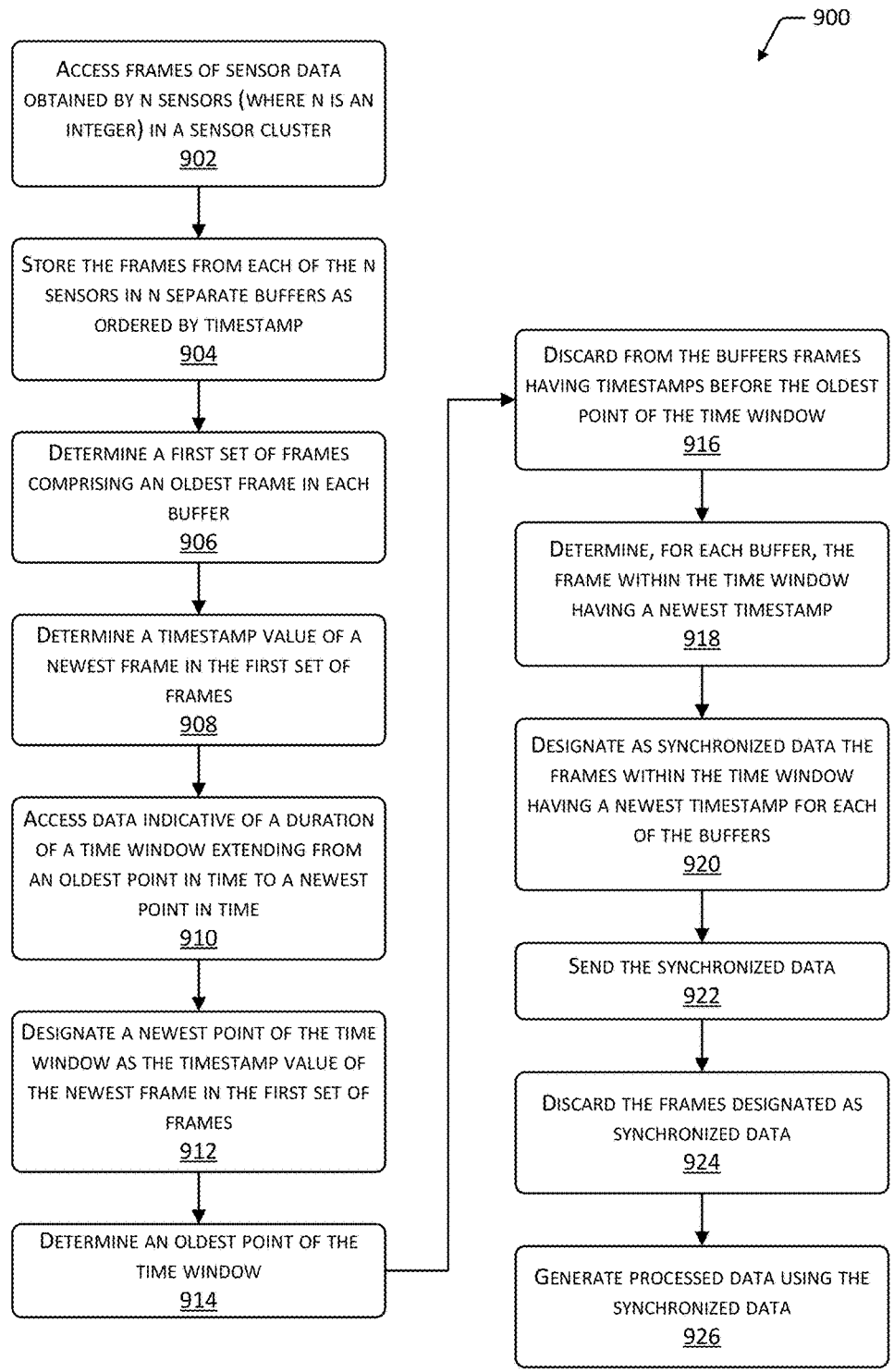
FIG. 9 illustrates a flow diagram of a process of generating synchronized data, according to some implementations.

FIG. 9 illustrates a flow diagram 900 of a process of generating synchronized data 130, according to some implementations. In some implementations, the process may be performed at least in part by one or more of the server 204, the sensor 120, or another computing device.

Block 902 accesses a feed 604 of frames 332 sent from each of a plurality of sensors 120. Each of the frames 332 may include one or more of timestamp data 334, payload such as one or more of image data 336, weight data 338, sensor identifier, or other information. For example, the sensors 120 may comprise imaging sensors 120(1) such as cameras, with each frame 332 including timestamp data 334 and image data 336.

Block 904 stores the frames 332 from each feed 604. In one implementation, the frames 332 from each feed 604 may be stored in a separate buffer 342. For example, the frames 332(1) associated with the feed 604(1) from imaging sensor 120(1) may be stored in the buffer 342(1). Within each buffer 342, the frames 332 may be ordered by timestamp data 334. For example, the frames 332 within the buffer 342 may be sorted in order of increasing timestamp data 334. In other implementations, the frames 332 may be stored in a common memory space, and other indicia may be used to distinguish frames 332 from one feed 604 to another. For example, a bit flag may be set to indicate a particular sensor 120(1), feed, and so forth.

In some implementations, the timestamp data 334 for each of the frames 332 may be generated or otherwise assigned by the sensor 120 that generated the frame 332. For example, the hardware processor on board the sensor 120 may access the local time value from a local clock. The timestamp data 334 for the frame 332 may then be generated using local time value from the local clock.

Block 906 determines a first set of frames 708 including an oldest frame in each of the buffers 342. For example, where the frames 332 in each of the buffers 342 have been sorted in order of increasing timestamp data 334 (oldest to newest), a first frame 332 in this sort may be the oldest for that buffer 342.

Block 908 determines a timestamp value of a newest frame 710 in the first set of frames 708. For example, the timestamp data 334 for each of the frames 332 in the first set of frames 708 may be sorted in order of increasing timestamp data 334, and the last frame 332 of the sort may be designated as the newest frame in the first set of frames 708.

Block 910 accesses data indicative of a duration 340(1) of a time window 712 extending from an oldest point 340(2) in time to a newest point 340(3) in time. For example, the time window data 340 may be retrieved in the memory 316.

Block 912 designates a newest point 340(3) of the time window 712 as the timestamp value of the newest frame 710 in the first set of frames 708. For example, the newest point 340(3) of the time window 712 may be set to the timestamp value of a newest frame 710 in the first set of frame 708. In some implementations, the explicit designation of endpoints of the time windows 712 may be implicitly performed in other operations.

Block 914 determines an oldest point 340(2) of the time window 712. For example, from the timestamp value of the newest frame 710, the duration 340(1) may be subtracted to determine the oldest point 340(2) of the time window 712.

Block 916 discards from the buffers 342 frames 332 having timestamp data 334 indicative of times before the oldest point 340(2) of the time window 712. For example, the frames 332 that occurred before the interval specified by the time window 712 may be removed from the buffer 342, disregarded from further consideration by the process, and so forth.

Block 918 determines, for each buffer 342, the frame 332 within the time window 712 having a newest timestamp. For example, within the time window 712 there may be more than frame 332. From the plurality of frames 332 within the same buffer 342, the frame 332 having the newest timestamp data 334 is selected. For example, the timestamp data 334 for each of the frames 332 in the same buffer 342 and within the time window 712 may be sorted in order of increasing timestamp data 334, and the last frame 332 of the sort may be designated as the frame 332 having the newest timestamp.

Block 920 designates as synchronized data 130 the frames 332 having a newest timestamp for each of the buffers 342. For example, where three buffers 342 are in use, the synchronized data 130 may include three frames 332 of data, one from each of the buffers 342.

Block 922 sends the synchronized data 130. For example, the synchronized data 130 may be sent for storage in the memory 316, sent to another server 204, and so forth.

Block 924 discards the frames 332 designated as the synchronized data 130. For example, once sent, the frames 332 may be deleted or otherwise removed from their respective buffers 342.

Block 926 generates process data using synchronized data 130. For example, the synchronized data 130 comprises image data 336 from a plurality of imaging sensors 120(1), an aggregate image 502 may be generated from at least a portion of the frames 332 in the synchronized data 130. Continuing the example, the aggregate image 502 may present an apparent overhead view of the entire facility 102 at the period of time specified by the time window 712.

Figure 10:
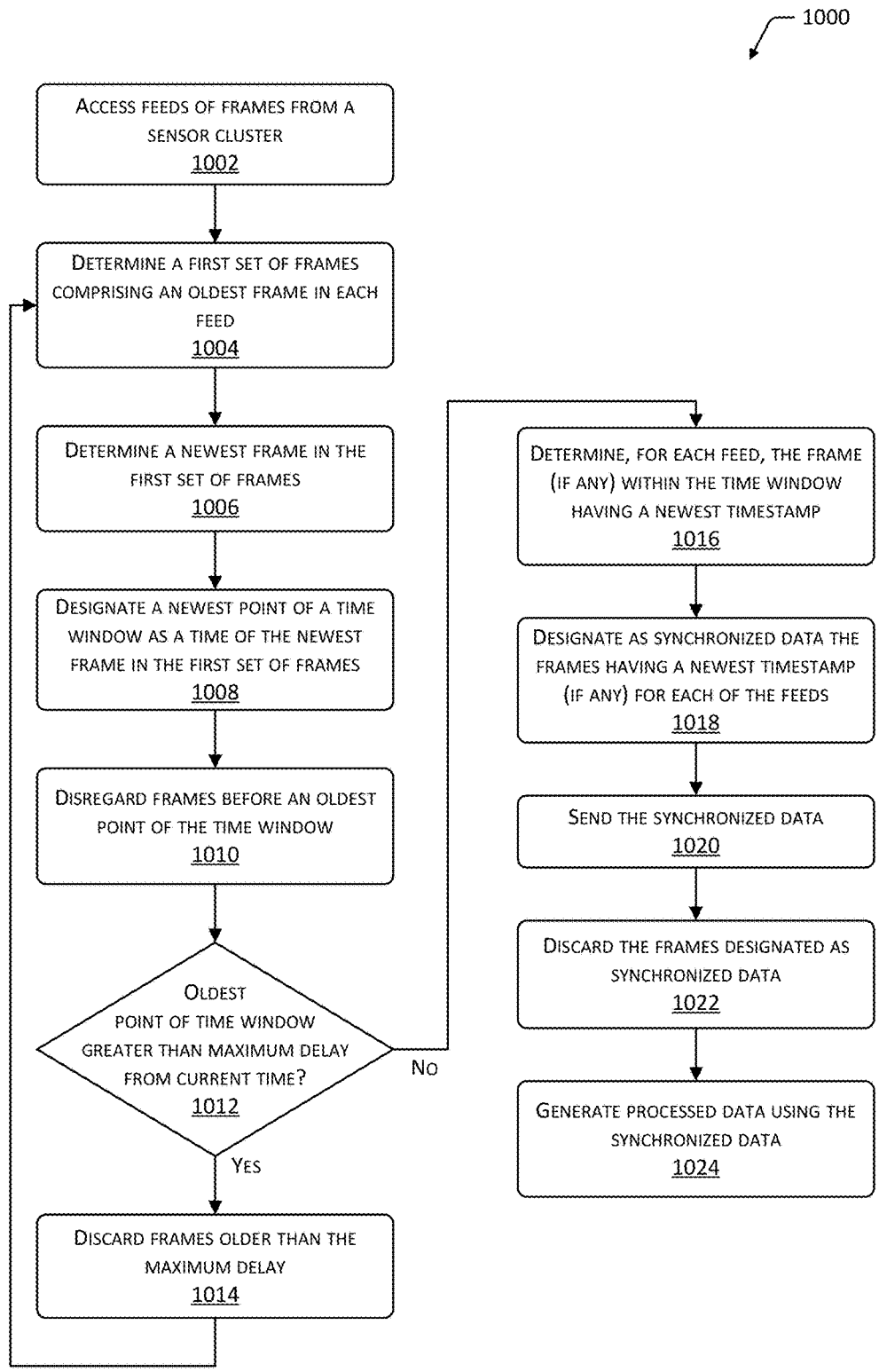
FIG. 10 illustrates a flow diagram of another process of generating synchronized data, according to some implementations.

FIG. 10 illustrates a flow diagram 1000 of another process of generating synchronized data 130, according to some implementations. In some implementations, the process may be performed at least in part by one or more of the server 204, the sensor 120, or another computing device.

Block 1002 accesses a plurality of feeds 604 of frames 332 from a sensor cluster 602. For example, the synchronization module 328 may receive the feeds 604 from the data acquisition module 326. The feeds 604 may originate from sensors 120 that are acquiring data from a designated area, such as a particular portion of the facility 102. Each of the frames 332 may include one or more of timestamp data 334, payload such as one or more of image data 336, weight data 338, sensor identifier, or other information.

In one implementation, the frames 332 from a particular feed 604 may be stored within a particular buffer 342. For example, each feed 604 may have an associated buffer 342. In another implementation, the frames 332 may be stored in a common storage area, such as a single buffer 342. In this implementation, data stored in frame 332 may be used to associate the frame 332 with a particular feed 604. For example, the frame 332 may store a sensor identifier, feed identifier, and so forth, which may be used to distinguish the frames 332 in the memory from one feed 604 to another.

Block 1004 determines a first set of frames 708 including an oldest frame in each feed 604. For example, a single frame 332 from each feed 604 may be designated as the oldest frame for that particular feed 604. The first set of frames 708 may consist of those single frames 332.

In one implementation, determination of whether a particular frame 332 is "newest" or "oldest" may be made by comparing the timestamp data 334 of the frames 332 with one another, with current time 608, and so forth. In another implementation, the frames 332 may include a sequence number, order number, serial number, and so forth that may be indicative of placement of the frame 332 within the feed 604. For example, frame 332(1) may have a sequence number of "0001" while frame 332(71) has a sequence number of "0071". The determination in this implementation may be made by comparing the sequence numbers with one another. Continuing the example, the frame 332(1) may be designated as the "oldest" of the two frames 332 due to its lower sequence number, while the frame 332(71) is designated as the "newest" due to its greater sequence number.

Block 1006 determines a newest frame 332 in the first set of frames 708. For example, the timestamp data 334 of the frames 332 within the first set of frames 708 may be sorted, and the newest frame 332 may appear at the end of that sort.

Block 1008 designates a newest point 340(3) of a time window 712 as a time of the newest frame 332 in the first set of frames 708. For example, the timestamp data 334 of the newest frame 332 in the first set of frames 708 may indicate a time of 00:00:35.090. The newest point 340(3) may be designated at the time 00:00:35.090.

The following description and use of the time window 712 is included by way of illustration, and not necessarily as a limitation. In some implementations, instead of the explicit determination of the time window 712 as described in FIGS. 9 and 10, the processes may be configured to operate using the endpoints associated therewith. This is described in more detail below with regard to FIG. 11.

Block 1010 may disregard frames 332 occurring before an oldest point 340(2) of the time window 712. The oldest point 340(2) may be determined by subtracting the duration 340(1) of the time window 712 from the timestamp data 334 associated with the newest point 340(3).

In some implementations, the process may be configured to prevent generating synchronized data 130 that is out of date. For example, block 1012 may determine if the oldest point 340(2) of the time window 712 is greater than the maximum delay 610 from the current time 608. Continuing the example, the maximum delay 610 may be 1 second. Should the determination of block 1012 indicate that the oldest point 340(2) is greater than the maximum delay 610, the process may proceed to block 1014. Block 1014 discards frames 332 having timestamp data 334 older than the maximum delay 610, and proceeds to block 1004. Should the determination of block 1012 indicate that the oldest point 340(2) is not greater than the maximum delay 610, the process may proceed to block 1016.

Block 1016 determines, for each feed 604, the frame 332 within the time window 712 that has a newest timestamp. For example, the timestamp data 334 of the frames 332 within each feed 604 may be sorted, and the frame 332 with the newest timestamp data 334 appears at one of the ends of that sort.

Block 1018 designates as synchronized data 130 the determined frames 332 for each of the feeds 604. The synchronized data 130 may consist of a frame 332 from each of the feeds 604 within the time window 712. In one implementation, when a frame 332 from a particular sensor 120 is absent from the time window 712, the remaining frames 332 may be designated as the synchronized data. In another implementation other techniques may be employed. For example, the newest point 340(3) may be moved to another time that is closer to current time 608.

Block 1020 sends the synchronized data 130. For example, the synchronized data 130 may be sent for storage in the memory 316, sent to another server 204, and so forth.

Block 1022 discards the frames 332 designated as the synchronized data 130. For example, once sent, the frames 332 may be deleted or otherwise removed from their respective buffers 342.

Block 1024 generates processed data using synchronized data 130. For example, the synchronized data 130 may be merged to produce aggregate data indicative of input to the sensor cluster 602 within the time window 712. For example, the aggregate data may indicate the weight data 338 for the inventory locations 114 within a particular rack and within the time interval 712. In another example, the synchronized data 130 may be used to determine a location of one or more objects within the facility 102.

Figure 11:
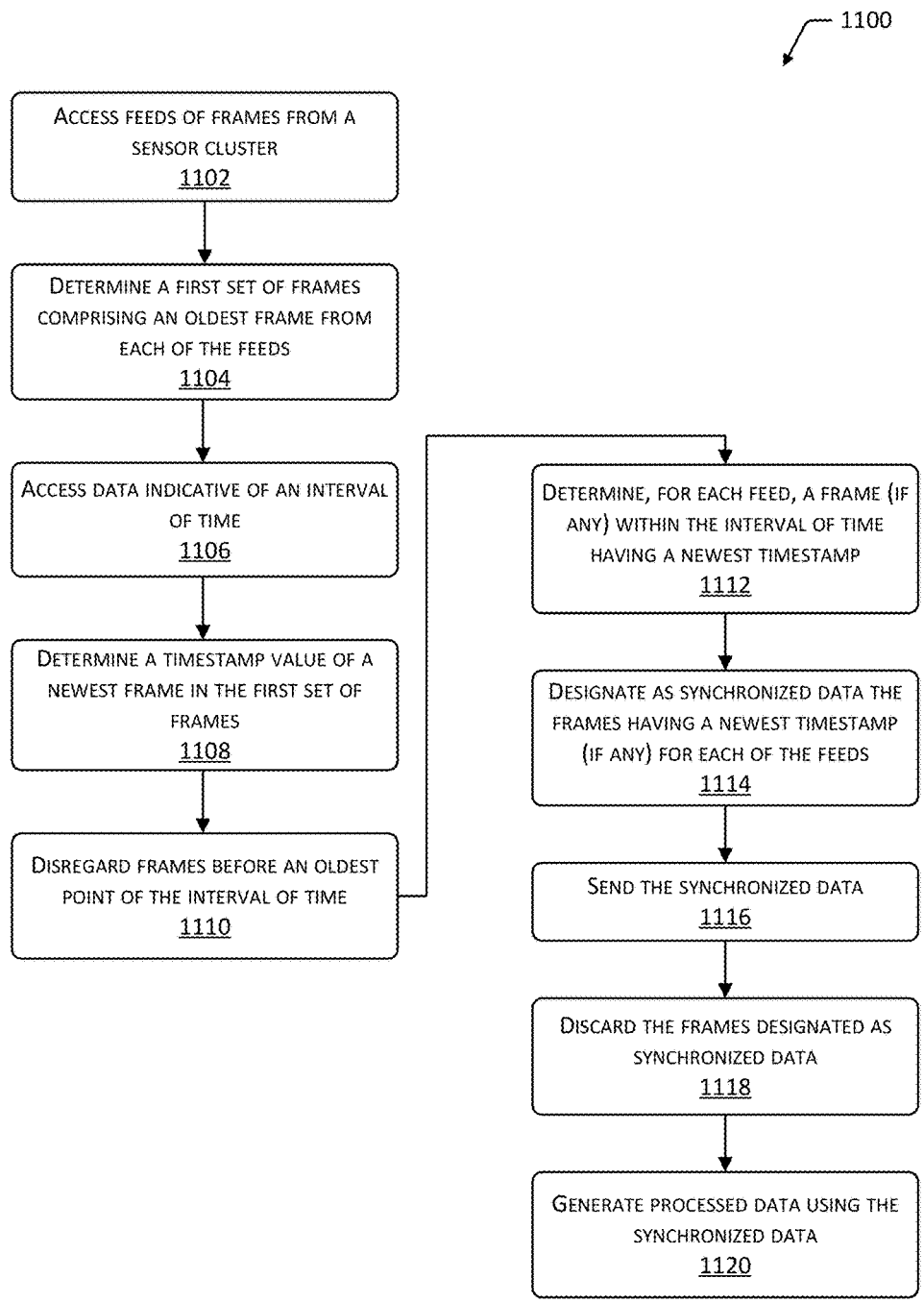
FIG. 11 illustrates a flow diagram of another process of generating synchronized data, according to some implementations.

FIG. 11 illustrates a flow diagram 1100 of another process of generating synchronized data 130 without explicit use of the time window 712, according to some implementations. In some implementations, the process may be performed at least in part by one or more of the server 204, the sensor 120, or another computing device.

Block 1102 accesses a plurality of feeds 604 of frames 332 from a sensor cluster 602. For example, the synchronization module 328 may receive the feeds 604 from the data acquisition module 326. The feeds 604 may originate from sensors 120 that are acquiring data from a designated area, such as a particular portion of the facility 102. Each of the frames 332 may include one or more of timestamp data 334, payload such as one or more of image data 336, weight data 338, sensor identifier, or other information.

In one implementation, the frames 332 from a particular feed 604 may be stored within a particular buffer 342. For example, each feed 604 may have an associated buffer 342. In another implementation, the frames 332 may be stored in a common storage area, such as a single buffer 342. In this implementation, data stored in frame 332 may be used to associate the frame 332 with a particular feed 604. For example, the frame 332 may store a sensor identifier, feed identifier, and so forth, which may be used to distinguish the frames 332 in the memory from one feed 604 to another.

Block 1104 determines a first set of frames 708 including an oldest frame in each feed 604. For example, a single frame 332 from each feed 604 may be designated as the oldest frame for that particular feed 604. The first set of frames 708 may consist of those single frames 332.

In one implementation, determination of whether a particular frame 332 is "newest" or "oldest" may be made by comparing the timestamp data 334 of the frames 332 with one another, with current time 608, and so forth. In another implementation, the frames 332 may include a sequence number, order number, serial number, and so forth that may be indicative of placement of the frame 332 within the feed 604. For example, frame 332(1) may have a sequence number of "0001" while frame 332(71) has a sequence number of "0071". The determination in this implementation may be made by comparing the sequence numbers with one another. Continuing the example, the frame 332(1) may be designated as the "oldest" of the two frames 332 due to its lower sequence number, while the frame 332(71) is designated as the "newest" due to its greater sequence number.

Block 1106 access data indicative of an interval of time. For example, the interval of time may be the duration of the time window 712.

Block 1108 determines a timestamp value of a newest frame 332 in the first set of frames 708. For example, the timestamp data 334 of the frames 332 within the first set of frames 708 may be sorted, and the newest frame 332 may appear at the end of that sort as having a value of timestamp data 334 that is closest to the current time. For example, the timestamp data 334 of the newest frame 332 in the first set of frames 708 may indicate a time of 00:00:35.090. The timestamp value of the newest frame 332 in the first set of frames 708 may thus be designated the newest point 340(3) at time 00:00:35.090.

Block 1110 may disregard frames 332 occurring before an oldest point 340(2) of the interval of time. The oldest point 340(2) may be determined by subtracting the duration 340(1) of the interval of time from the timestamp data 334 associated with the timestamp value of the newest frame in the first set of frames.

Similar to the process described above with regard to FIG. 10, in some implementations, the process may be configured to prevent generating synchronized data 130 that is out of date. For example, a block may determine if the oldest point 340(2) of the interval of time is greater than the maximum delay 610 from the current time 608. Continuing the example, the maximum delay 610 may be 1 second. Should the determination indicate that the oldest point 340(2) is greater than the maximum delay 610, the process may proceed to discard frames 332 having timestamp data 334 older than the maximum delay 610, and proceed to block 1104. Should the determination indicate that the oldest point 340(2) is not greater than the maximum delay 610, the process may proceed to block 1112.

Block 1112 determines, for each feed 604, the frame 332 within the interval of time that has a newest timestamp. For example, the timestamp data 334 of the frames 332 within each feed 604 may be sorted, and the frame 332 with the newest timestamp data 334 appears at one of the ends of that sort.

Block 1114 designates as synchronized data 130 the determined frames 332 for each of the feeds 604. The synchronized data 130 may consist of a frame 332 from each of the feeds 604 within the interval of time. In one implementation, when a frame 332 from a particular sensor 120 is absent from the time window 712, the remaining frames 332 may be designated as the synchronized data. In another implementation other techniques may be employed. For example, the newest point 340(3) may be moved to another time that is closer to current time 608.

Block 1116 sends the synchronized data 130. For example, the synchronized data 130 may be sent for storage in the memory 316, sent to another server 204, and so forth.

Block 1118 discards the frames 332 designated as the synchronized data 130. For example, once sent, the frames 332 may be deleted or otherwise removed from their respective buffers 342.

Block 1120 generates processed data using synchronized data 130. For example, the synchronized data 130 may be merged to produce aggregate data indicative of input to the sensor cluster 602 within the interval of time. For example, the aggregate data may indicate the weight data 338 for the inventory locations 114 within a particular rack is within the interval of time. In another example, the synchronized data 130 may be used to determine a location of one or more objects within the facility 102.

By using the techniques described in this disclosure, synchronized data 130 may be generated quickly and efficiently from many sensors 120. The synchronized data 130 may then be processed and used to facilitate operation of the facility 102.

The processes discussed herein may be implemented in hardware, software, or a combination thereof. In the context of software, the described operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the steps or operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described herein. The computer-readable storage medium may be one or more of an electronic storage medium, a magnetic storage medium, an optical storage medium, a quantum storage medium, and so forth. For example, the computer-readable storage media may include, but is not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Thus, although certain steps have been described as being performed by certain devices, software programs, processes, or entities, this need not be the case, and a variety of alternative implementations will be understood by those having ordinary skill in the art.

Additionally, those having ordinary skill in the art readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as exemplary forms of implementing the claims.

What is claimed is:

1. A system comprising:
a plurality of cameras within a facility;
a first memory storing a first sequence of computer-executable instructions; and
a hardware processor to execute the first sequence of computer-executable instructions in an order set forth to:
access a plurality of feeds of frames, each feed sent from one of the plurality of cameras, each frame including image data and a timestamp;
store, in a separate buffer for each camera, the frames from the each camera, with the frames in each separate buffer ordered by the timestamp of the frames;
determine a first set of frames including an oldest frame from each of the separate buffers;
designate a time window extending from a prior oldest point in time to a timestamp value of a newest frame in the first set of frames;
discard from the separate buffers any frames having timestamps before the prior oldest point in time of the time window;
determine, for the each separate buffer, a frame within the time window that has a timestamp value closest to a newest point of the time window; and
designate as synchronized data a frame from each of the separate buffers that is within the time window and has the timestamp value closest to the newest point of the time window.

2. The system of claim 1, the hardware processor further configured to execute the first sequence of computer-executable instructions to:
generate an aggregate image by combining the image data from at least a portion of the frames in the synchronized data to form a single image that depicts at least a portion of the facility exceeding a field of view of a single one of the plurality of cameras; and
determine a location of one or more objects within the facility using the aggregate image.

3. The system of claim 1, further comprising:
a second memory storing a second sequence of computer-executable instructions; and
the hardware processor further configured to execute the second sequence of computer-executable instructions to:
access the plurality of feeds of the frames at a predetermined interval.

4. A system comprising:
a sensor cluster comprising a plurality of sensors;
a memory, storing a first sequence of computer-executable instructions; and
a hardware processor to execute the first sequence of computer-executable instructions in an order set forth to:
access a plurality of feeds of frames, wherein each feed comprises data from a different sensor in the sensor cluster;
determine a first set of frames including an oldest frame in the each feed;
determine a timestamp value of a newest frame in the first set of frames;
designate a newest point of a time window as the timestamp value of the newest frame in the first set of frames;
determine, for the each feed, a frame within the time window, wherein the frame has a newest timestamp; and
designate as synchronized data the frame from the each of the feeds having the newest timestamp.

5. The system of claim 4, the hardware processor further configured to execute, after the computer-executable instructions to determine the timestamp value of the newest frame in the first set of frames, the first sequence of computer-executable instructions in the order set forth to:
determine an oldest point of the time window is greater than a maximum delay from current time; and
discard frames older than the maximum delay.

6. The system of claim 4, the hardware processor further configured to execute, after the computer-executable instructions to designate the synchronized data, the first sequence of computer-executable instructions in the order set forth to:
merge the synchronized data to produce aggregate data indicative of input to the sensor cluster within the time window.

7. The system of claim 4, the sensor cluster comprising a plurality of sensors acquiring data from a designated area; and
the plurality of sensors including one or more of:
an imaging sensor,
a three-dimensional sensor,
a touch sensor,
a weight sensor,
a light sensor,
a radio-frequency identification tag reader,
a radio frequency receiver, or
a touchpoint sensor.

8. The system of claim 4, the frames including:
timestamp data; and
one or more of: image data, weight data, audio data, light sensor data, accelerometer data, radio frequency identification data, radio frequency data, or gyroscope data.

9. The system of claim 4, the hardware processor further configured to, before the computer-executable instructions to determine the frame within the time window, execute the first sequence of computer-executable instructions in the order set forth to:
disregard any frames having a timestamp indicative of a time before an oldest point of the time window.

10. The system of claim 4, the hardware processor further configured to execute the first sequence of computer-executable instructions to:
determine the newest frame in the first set of frames with computer-executable instructions to:
access a timestamp value of a first frame;
access a timestamp value of a second frame;
determine the second frame has a timestamp value later than the first frame;
designate the second frame as the newest frame; and
determine the oldest frame in the each feed with computer-executable instructions to:
access a timestamp value of a third frame;
access a timestamp value of a fourth frame;
designate the third frame has a timestamp value earlier than the fourth frame;
and
designate the third frame as the oldest frame.

11. The system of claim 4, the hardware processor further configured to execute the first sequence of computer-executable instructions to:
access a sequence number associated with each frame, wherein the sequence number is indicative of placement of the each frame in a sequence with respect to other frames in the each feed;

determine the newest frame in the first set of frames with computer-executable instructions to:
  access a sequence number of a first frame;
  access a sequence number of a second frame;
  determine the second frame has a sequence number later than the first frame;
  designate the second frame as the newest frame in the first set of frames; and
determine the oldest frame in the each feed with computer-executable instructions to:
  access a sequence number of a third frame;
  access a sequence number of a fourth frame;
  designate the third frame has a sequence number earlier than the fourth frame; and
  designate the third frame as the oldest frame in the each feed.

12. The system of claim 4, the hardware processor further configured to execute the first sequence of computer-executable instructions to:
store, in a separate buffer associated with the each feed, frames of one of the feeds.

13. The system of claim 4, the hardware processor further configured to execute the first sequence of computer-executable instructions to:
before the determination of the first set of frames, determine a corresponding feed associated with each of the frames based on data in the each of the frames.

14. A method comprising:
accessing a plurality of frames generated by a plurality of sensors;
determining a first set of frames that include an oldest frame from each of the plurality of sensors;
accessing data indicative of an interval of time;
determining a time of a newest frame in the first set of frames;
determining a second set of frames that includes a frame from the each of the plurality of sensors that is within the interval of time before the time of the newest frame in the first set of frames; and
designating the second set of frames as synchronized data.

15. The method of claim 14, further comprising:
removing, from a buffer, frames having timestamps before the interval of time.

16. The method of claim 14, further comprising:
generating aggregate data from at least a portion of the frames in the synchronized data.

17. The method of claim 14, further comprising:
determining an oldest point of the interval of time is greater than a maximum delay from current time; and
discarding frames older than the maximum delay.

18. The method of claim 14, further comprising:
assigning a timestamp to each frame, wherein the timestamp is indicative of a time the frame was generated by one of the plurality of sensors.

19. The method of claim 14, further comprising:
determining a location of one or more objects in a facility based on the synchronized data.

20. The method of claim 14, further comprising:
generating the plurality of frames with the plurality of sensors, wherein the plurality of frames include timestamp data and one or more of: image data, weight data, audio data, light sensor data, accelerometer data, radio frequency identification data, radio frequency data, or gyroscope data.

21. A method comprising:
accessing a plurality of frames of data;
determining a first set of frames that include an oldest frame from each source of the plurality of frames of data;
accessing data indicative of an interval of time;
determining a time of a newest frame in the first set of frames;
determining a second set of frames that includes a frame from the each source of the plurality of frames of data that is within the interval of time before the time of the newest frame in the first set of frames; and
designating the second set of frames as synchronized data.

* * * * *